United States Patent
Gillick et al.

[19]

[11] Patent Number: 6,167,377
[45] Date of Patent: *Dec. 26, 2000

[54] SPEECH RECOGNITION LANGUAGE MODELS

[75] Inventors: Laurence S. Gillick, Newton; Joel M. Gould, Winchester; Robert Roth, Newtonville; Paul A. van Mulbregt, Wayland; Michael D. Bibeault, Dracut, all of Mass.

[73] Assignee: Dragon Systems, Inc., Newton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/825,535

[22] Filed: Mar. 28, 1997

[51] Int. Cl.[7] .............................. G10L 15/06; G10L 15/08
[52] U.S. Cl. .......................... 704/240; 704/244; 704/255
[58] Field of Search .............................. 704/3, 231, 243, 704/244, 252, 255, 257, 250, 240; 381/71.11; 708/322

[56] References Cited

U.S. PATENT DOCUMENTS 4,741,036   4/1988   Bahl et al. ................................. 381/43
4,759,068   7/1988   Bahl et al. ................................. 381/43
4,783,803   11/1988  Baker et al. .

(List continued on next page.)

FOREIGN PATENT DOCUMENTS 0618565   10/1994   European Pat. Off. .
168565    10/1994   European Pat. Off. .
0 635 820 1/1995    European Pat. Off. .

OTHER PUBLICATIONS

Matsunaga et al., Task Adaptation in Syllable Trigram Models for Continuous Speech Recognition, IEICE Transactions on Information and Systems E76–D:38–43 (1993).

Rao et al., Language Model Adaptation via Minimum Discrimination Information, Proceedings of the International Conference on Acoustics, Speech, and Signal Processing 1:161–164 (1995).

Iyer et al., Modeling Long Distance Dependence in Language: Topic Mixtures vs. Dynamic Cache Models, Proceedings of the International Conference on Spoken Language Processing 1:236–239 (1996).

Kneser et al., On the Dynamic Adaptation of Stochastic Language Models, Speech Processing 2:586–589 (1993).

Mandel, Mark A. et al., "A Commercial Large–Vocabulary Discrete Speech Recognition System: DragonDictate," Language and Speech, vol. 35 (1, 2) (1992), pp. 237–246.

Lau, Raymond et al., "Adaptive Language Modeling Using the Maximum Entropy Principle," paper.

*Primary Examiner*—Tálivaldis I. Ŝmits
*Assistant Examiner*—Martin Lerner
*Attorney, Agent, or Firm*—Fish & Richardson P.C.

[57] ABSTRACT

Language model results are combined according to a combination expression to produce combined language model results for a set of candidates. A candidate is selected and the combination expression is adjusted using language model results associated with the selected candidate.

28 Claims, 15 Drawing Sheets

U.S. PATENT DOCUMENTS

| | | |
|---|---|---|
| 4,805,218 | 2/1989 | Bamberg et al. .......................... 381/43 |
| 4,805,219 | 2/1989 | Baker et al. ............................... 381/43 |
| 4,829,576 | 5/1989 | Porter ....................................... 381/43 |
| 4,833,712 | 5/1989 | Bahl et al. ................................. 381/43 |
| 4,931,950 | 6/1990 | Isle et al. ................................. 364/513 |
| 4,984,177 | 1/1991 | Rondel et al. ............................... 704/3 |
| 4,984,178 | 1/1991 | Hemphill et al. . |
| 5,005,203 | 4/1991 | Ney . |
| 5,027,406 | 6/1991 | Roberts et al. .......................... 704/244 |
| 5,031,217 | 7/1991 | Nishimura ................................ 381/43 |
| 5,033,087 | 7/1991 | Bahl et al. ................................. 381/43 |
| 5,036,538 | 7/1991 | Oken et al. ............................... 381/43 |
| 5,054,085 | 10/1991 | Meisel et al. ............................. 381/43 |
| 5,202,952 | 4/1993 | Gillick et al. ............................... 395/2 |
| 5,231,670 | 7/1993 | Goldhor et al. .......................... 381/43 |
| 5,241,619 | 8/1993 | Schwartz et al. . |
| 5,263,117 | 11/1993 | Nadas et al. . |
| 5,280,563 | 1/1994 | Ganong ....................................... 395/2 |
| 5,293,584 | 3/1994 | Brown et al. ........................... 704/257 |
| 5,384,892 | 1/1995 | Strong ................................... 395/2.52 |
| 5,390,279 | 2/1995 | Strong ......................................... 395/2 |
| 5,428,707 | 6/1995 | Gould et al. . |
| 5,467,425 | 11/1995 | Lau et al. .............................. 395/2.52 |
| 5,606,644 | 2/1997 | Chou et al. ............................. 704/244 |
| 5,613,036 | 3/1997 | Strong ..................................... 704/244 |
| 5,627,896 | 5/1997 | Southward et al. ................. 381/71.11 |
| 5,651,096 | 7/1997 | Pallakoff et al. . |
| 5,794,189 | 8/1998 | Gould ..................................... 704/257 |
| 5,839,106 | 11/1998 | Bellegarda ............................ 704/257 |
| 5,960,392 | 9/1999 | Sundberg et al. ...................... 704/236 |
| 6,055,498 | 4/2000 | Neumeyer et al. ..................... 704/246 |
| 6,081,779 | 6/2000 | Besling et al. .......................... 704/257 |

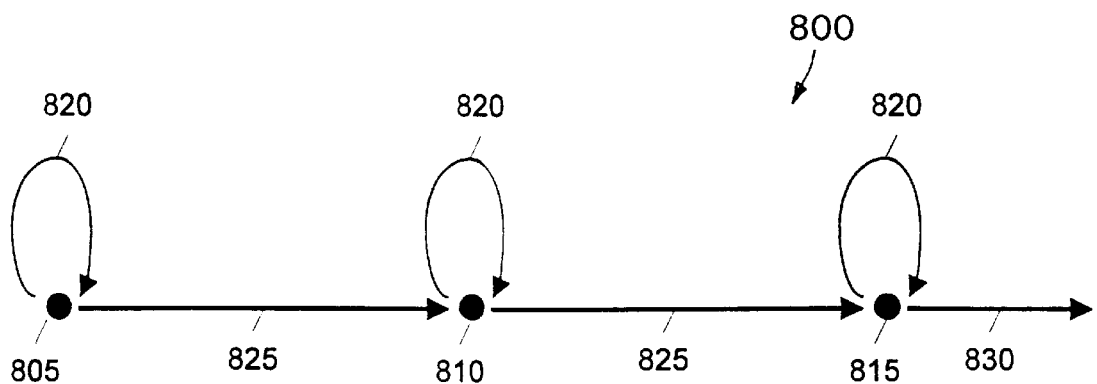
FIG. 8A
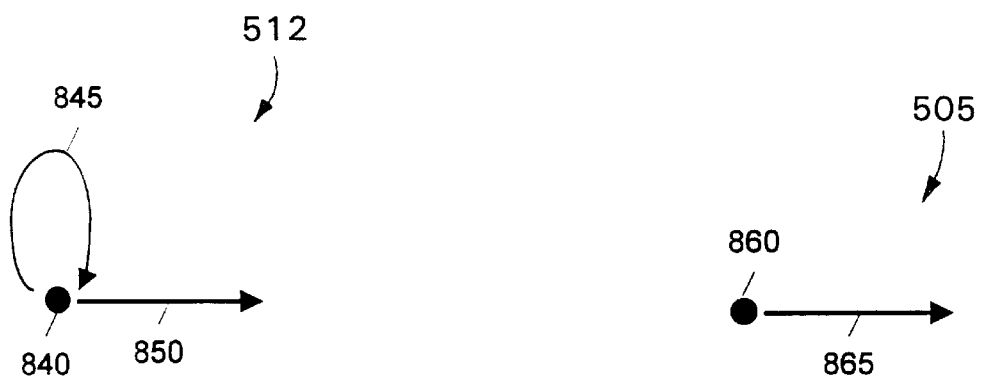
FIG. 8B
FIG. 8C

FIG. 9

| Frame | 840 ("A") | 805 ("B") | 810 ("C") | 815 ("D") | Next Node ("N") |
|---|---|---|---|---|---|
| 0 | 0 | --- | --- | --- | --- |
| 1 | $S_{A1}=A_{A1}$ | $S_{B1}=A_{B1}$ | --- | --- | --- |
| 2 | $S_{A2}=S_{A1}+A_{A2}$ | $S_{B2}=\min(S_{B1}+\text{stay}_B, S_{A1}) + A_{B2}$ | $S_{C2}=S_{B1}+\text{leave}_B+A_{C2}$ | --- | --- |
| 3 | $S_{A3}=S_{A2}+A_{A3}$ | $S_{B3}=\min(S_{B2}+\text{stay}_B, S_{A2}) + A_{B3}$ | $S_{C3}=\min(S_{C2}+\text{stay}_C, S_{B2}+\text{leave}_B)+A_{C3}$ | $S_{D3}=S_{C2}+\text{leave}_C+A_{D3}$ | --- |
| 4 | $S_{A4}=S_{A3}+A_{A4}$ | $S_{B4}=\min(S_{B3}+\text{stay}_B, S_{A3}) + A_{B4}$ | $S_{C4}=\min(S_{C3}+\text{stay}_C, S_{B3}+\text{leave}_B)+A_{C4}$ | $S_{D4}=\min(S_{D3}+\text{stay}_D, S_{C3}+\text{leave}_C)+A_{D4}$ | $S_{N4}=S_{D2}+\text{leave}_D+A_{D4}$ |
| n | $S_{An}=S_{An-1}+A_{An}$ | $S_{Bn}=\min(S_{Bn-1}+\text{stay}_B, S_{An-1}) + A_{Bn}$ | $S_{Cn}=\min(S_{Cn-1}+\text{stay}_C, S_{Bn-1}+\text{leave}_B)+A_{Cn}$ | $S_{Dn}=\min(S_{Dn-1}+\text{stay}_D, S_{Cn-1}+\text{leave}_C)+A_{Dn}$ | $S_{Nn}=\min(S_{Nn-1}+\text{stay}_M, S_{Mn-1}+\text{leave}_M)+A_{Nn}$ |

FIG. 10

| Frame | 810 ("A") | 805 ("B") | 810 ("C") | 815 ("D") | Next Node ("N") |
|---|---|---|---|---|---|
| 0 | $S_{A0}=0$ | --- | --- | --- | --- |
| 1 | $S_{A1}=f(S_{A0}, A_{A1})$ | $S_{B1}=f(S_{A0}, A_{B1})$ | --- | --- | --- |
| 2 | $S_{A2}=f(S_{A1}, A_{A2})$ | $S_{B2}=f(S_{B1}, \text{stay}_B, S_{A1}, A_{B2})$ | $S_{C2}=f(S_{B1}, \text{leave}_B, A_{C2})$ | --- | --- |
| 3 | $S_{A3}=f(S_{A2}, A_{A3})$ | $S_{B3}=f(S_{B2}, \text{stay}_B, S_{A2}, A_{B3})$ | $S_{C3}=f(S_{C2}, \text{stay}_C, S_{B2}, \text{leave}_B, A_{C3})$ | $S_{D3}=f(S_{C2}, \text{leave}_C, A_{D3})$ | --- |
| 4 | $S_{A4}=f(S_{A3}, A_{A4})$ | $S_{B4}=f(S_{B3}, \text{stay}_B, S_{A3}, A_{B4})$ | $S_{C4}=f(S_{C3}, \text{stay}_C, S_{B3}, \text{leave}_B, A_{C4})$ | $S_{D4}=f(S_{D3}, \text{stay}_D, S_{C3}, \text{leave}_C, A_{D4})$ | $S_{N4}=f(S_{D3}, \text{leave}_D, A_{D3})$ |
| n | $S_{An}=f(S_{An-1}, A_{An})$ | $S_{Bn}=f(S_{Bn-1}, \text{stay}_B, S_{An-1}, A_{Bn})$ | $S_{Cn}=f(S_{Cn-1}, \text{stay}_C, S_{Bn-1}, \text{leave}_B, A_{Cn})$ | $S_{Dn}=f(S_{Dn-1}, \text{stay}_D, S_{Cn-1}, \text{leave}_C, A_{Dn})$ | $S_{Nn}=f(S_{Dn-1}, \text{leave}_N, A_{Nn})$ |

Vocabulary Builder

| Document | Size | Modified | Processed |
|---|---|---|---|
| E:\work\test docs\Sys-prog.doc | 839KB | 03/14/97 20:14 | No |
| E:\work\test docs\argot.txt | 133KB | 03/06/97 10:05 | No |
| E:\work\test docs\Buddha.doc | 33KB | 02/06/97 17:28 | No |
| E:\work\test docs\Jay's resume.doc | 25KB | 03/05/97 22:25 | No |
| E:\work\test docs\OWBB, e-mail.doc | 16KB | 05/15/96 18:10 | No |
| E:\work\test docs\3001.txt | 22KB | 02/18/97 07:26 | No |

Add  Remo  Vie  Read 6 documents to process: Total of 1069KB

FIG. 15

SPEECH RECOGNITION LANGUAGE MODELS

BACKGROUND

The invention relates to generating and adapting language models in speech recognition.

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A speech recognition system may be a "discrete" system that recognizes discrete words or phrases but which requires the user to pause briefly between each discrete word or phrase. Alternatively, a speech recognition system may be a "continuous" system that can recognize spoken words or phrases regardless of whether the user pauses between them. Continuous speech recognition systems typically have a higher incidence of recognition errors in comparison to discrete recognition systems due to complexities of recognizing continuous speech. A more detailed description of continuous speech recognition is provided in U.S. Pat. No. 5,202,952, entitled "LARGE-VOCABULARY CONTINUOUS SPEECH PREFILTERING AND PROCESSING SYSTEM," which is incorporated by reference.

In general, the processor of a continuous speech recognition system analyzes "utterances" of speech. An utterance includes a variable number of frames and corresponds, for example, to a period of speech followed by a pause of at least a predetermined duration.

The processor determines what the user said by finding acoustic models that best match the digital frames of an utterance, and identifying text that corresponds to those acoustic models. An acoustic model may correspond to a word, phrase or command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise.

The words or phrases corresponding to the best matching acoustic models are referred to as recognition candidates. The processor may produce a single recognition candidate for an utterance, or may produce a list of recognition candidates. Speech recognition techniques are discussed in U.S. Pat. No. 4,805,218, entitled "METHOD FOR SPEECH ANALYSIS AND SPEECH RECOGNITION," which is incorporated by reference.

In determining the acoustic models that best match an utterance, the processor may consult a language model that indicates a likelihood that the text corresponding to the acoustic models occurs in speech. For example, the language model may be a bigram model that indicates a likelihood that a given word follows a preceding word. Such a bigram model may be generated by analyzing a large sample of speech to identify pairs of words in the sample and identify a frequency with which the words occur in the sample.

SUMMARY

The invention provides a dynamic interpolation technique for use in combining scores from a collection of language models to produce a single language model score. The dynamic interpolation technique dynamically assigns weights to the scores of each model in a way that emphasizes the most effective language models. As such, the technique promises to permit speech recognition systems to make more effective use of a variety of language models, such as word unigram, bigram or trigram models, category models, topic models, and recent utterance, or recent buffer, models.

In one aspect, generally, the invention features combining language model results according to a combination expression to produce combined language model results for a set of candidates. One of the candidates is selected. The combination expression is then adjusted using language model results associated with the selected candidate.

Embodiments of the invention may include one or more of the following features. The combination expression may combine the language model results using combination weights associated with the language models. For example, when the language model results are numerical scores that indicate likelihoods associated with candidates, the combination expression may multiply the numerical score for a language model by a combination weight associated with the language model. The combination expression may be adjusted by adjusting the combination weights using language model results associated with the selected candidate.

The candidate may be selected by evaluating the candidates using the combined language model results. The evaluation may also use acoustic information associated with the candidates.

One of the language models may be a topic language model generated from user-supplied text. The topic language model may be generated by prompting a user to identify text, retrieving text identified by the user, and building the topic language model from the retrieved text. When the candidates are generated and evaluated using a vocabulary of words, generating the topic language model may include scanning the retrieved text to identify words from the text that are not included in the vocabulary of words, displaying the identified words to the user, and prompting the user to select words to be included in the vocabulary. Thereafter, words selected by the user may be added to the vocabulary. The language model may then be built for words included in the vocabulary.

In another general aspect, the invention features generating a topic language model as described above.

Other features and advantages will become apparent from the following description, including the drawings, and from the claims.

BRIEF DESCRIPTION OF THE DRAWING

FIGS. 8A, 8B and 8C are state graphs representing nodes of the lexical tree of FIG. 5.

FIGS. 9 and 10 are charts of scores corresponding to the states of the state graphs of FIGS. 8A, 8B and 8C.

FIGS. 15 and 16 are screen displays of a user interface of a vocabulary builder of the speech recognition system.

DESCRIPTION

Figure 1:
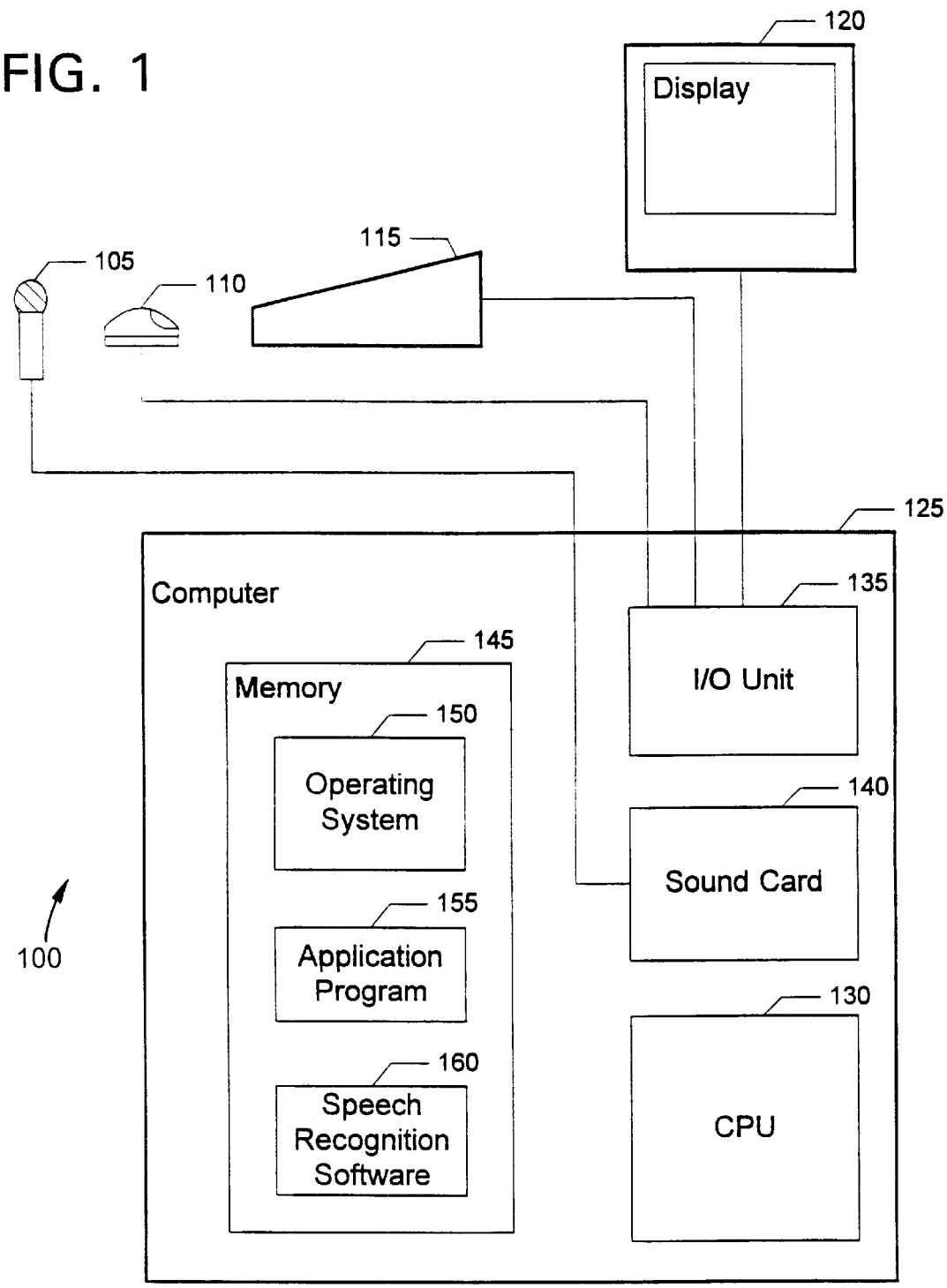
FIG. 1 is a block diagram of a speech recognition system.

FIG. 1 is a block diagram of a speech recognition system 100. The system includes input/output (I/O) devices (e.g., microphone 105, mouse 110, keyboard 115, and display 120) and a general purpose computer 125 having a processor 130, an I/O unit 135 and a sound card 140. A memory 145 stores data and programs such as an operating system 150, an application program 155 (e.g., a word processing program), and speech recognition software 160.

The microphone 105 receives the user's speech and conveys the speech, in the form of an analog signal, to the sound card 140, which in turn passes the signal through an analog-to-digital (A/D) converter to transform the analog signal into a set of digital samples. Under control of the operating system 150 and the speech recognition software 160, the processor 130 identifies utterances in the user's speech. Utterances are separated from one another by a pause having a sufficiently large, predetermined duration (e.g., 160–250 milliseconds). Each utterance may include one or more words of the user's speech.

Figure 2:
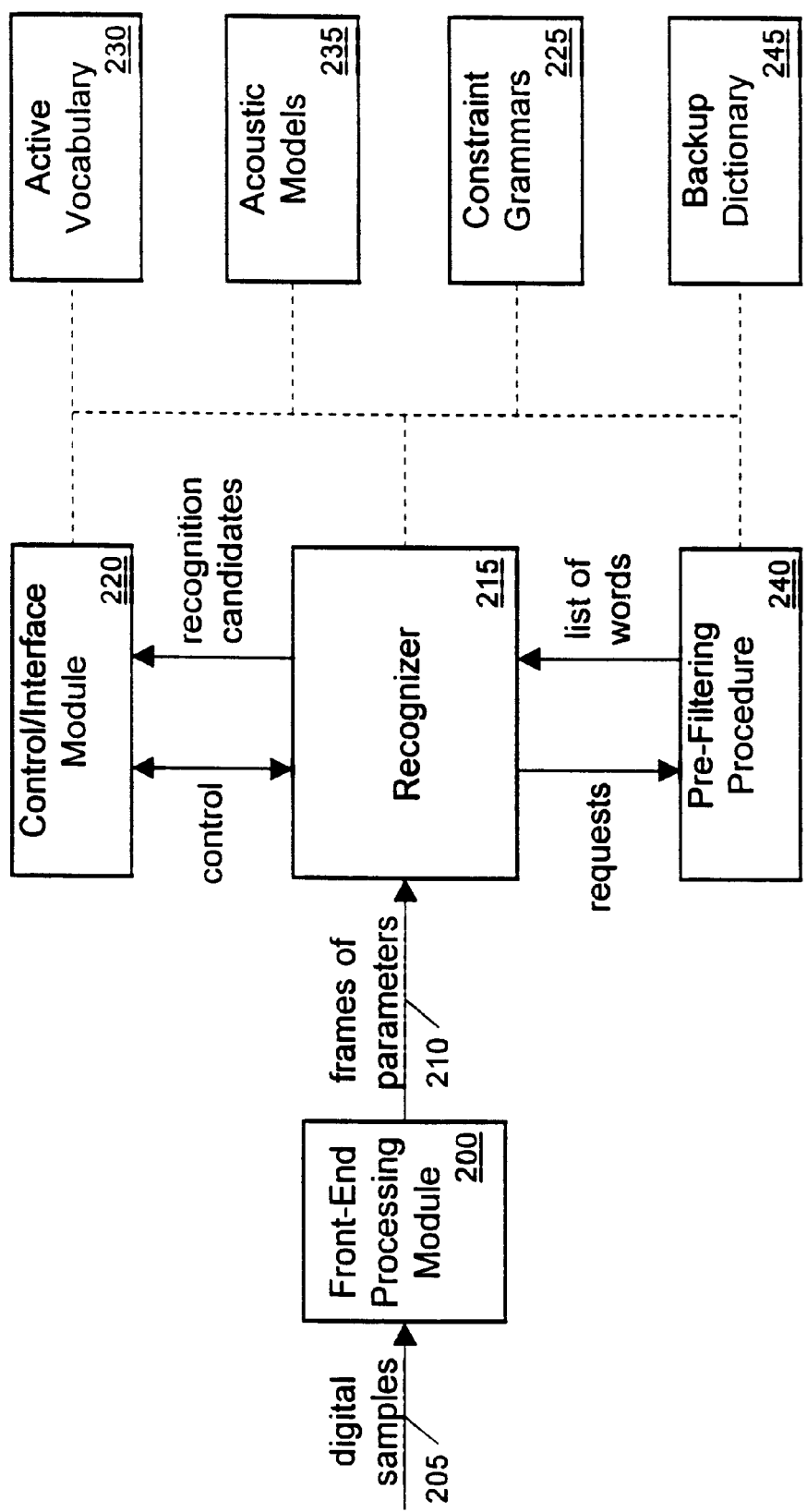
FIG. 2 is a block diagram of speech recognition software of the system of FIG. 1.

FIG. 2 illustrates components of the speech recognition software 160. For ease of discussion, the following description indicates that the components carry out operations to achieve specified results. However, it should be understood that each component actually causes the processor 130 to operate in the specified manner.

Initially, a front end processing module 200 converts the digital samples 205 from the sound card 140 into frames of parameters 210 that represent the frequency content of an utterance. Each frame includes 24 parameters and represents a short portion (e.g., 10 milliseconds) of the utterance.

Figure 3:
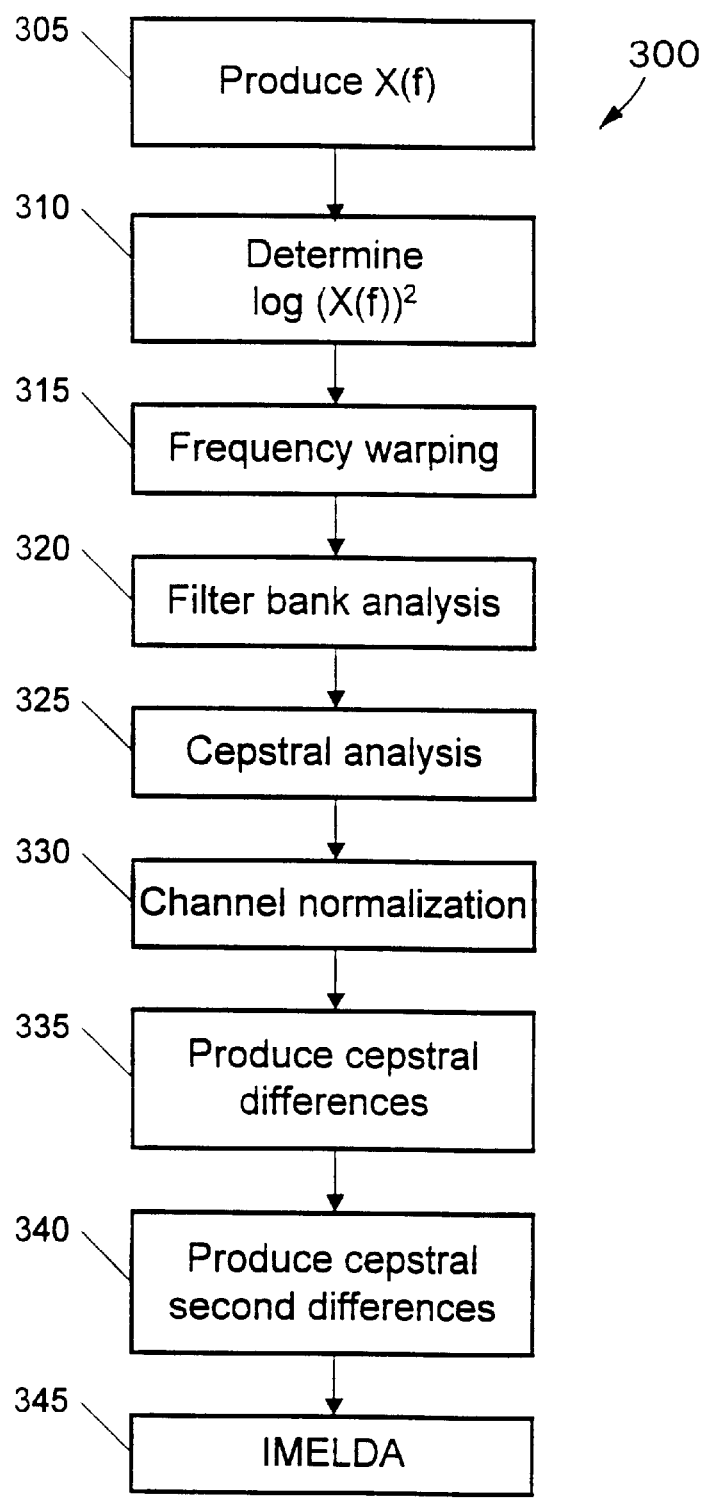
FIG. 3 is a flow chart of a signal processing procedure performed by the software of FIG. 2.

As shown in FIG. 3, the front end processing module 200 produces a frame from digital samples according to a procedure 300. The module first produces a frequency domain representation X(f) of the portion of the utterance by performing a Fast Fourier Transform (FFT) on the digital samples (step 305). Next, the module determines $\log(X(f))^2$ (step 310). The module then performs frequency warping (step 315) and a filter bank analysis (step 320) to achieve speaker normalization. See S. Wegmann et al., "Speaker Normalization on Conversational Speech," *Proc.* 1996 *ICASSP,* pp. I.339–I.341, which is incorporated by reference.

From the normalized results, the module performs cepstral analysis to produce twelve cepstral parameters (step 325). The module generates the cepstral parameters by performing an inverse cosine transformation on the logarithms of the frequency parameters. Cepstral parameters and cepstral differences have been found to emphasize information important to speech recognition more effectively than do the frequency parameters. After performing channel normalization of the cepstral parameters (step 330), the module produces twelve cepstral differences (i.e., the differences between cepstral parameters in successive frames) (step 335) and twelve cepstral second differences (i.e., the differences between cepstral differences in successive frames) (step 340). Finally, the module performs an IMELDA linear combination transformation to select the twenty four most useful parameters from the twelve cepstral parameters, the twelve cepstral differences, and the twelve cepstral second differences (step 345).

Referring again to FIG. 2, a recognizer 215 receives and processes the frames of an utterance to identify text corresponding to the utterance. The recognizer entertains several hypotheses about the text and associates a score with each hypothesis. The score reflects the probability that a hypothesis corresponds to the user's speech. For ease of processing, scores are maintained as negative logarithmic values. Accordingly, a lower score indicates a better match (a high probability) while a higher score indicates a less likely match (a lower probability), with the likelihood of the match decreasing as the score increases. After processing the utterance, the recognizer provides the best-scoring hypotheses to the control/interface module 220 as a list of recognition candidates, where each recognition candidate corresponds to a hypothesis and has an associated score. Some recognition candidates may correspond to text while other recognition candidates correspond to commands. Commands may include words, phrases or sentences.

The recognizer 215 processes the frames 210 of an utterance in view of one or more constraint grammars 225. A constraint grammar, which also may be referred to as a template or restriction rule, may be a limitation on the words that may correspond to an utterance, a limitation on the order or grammatical form of the words, or both. For example, a constraint grammar for menu-manipulation commands may include only entries from the menu (e.g., "file", "edit") or command words for navigating through the menu (e.g., "up", "down", "top", "bottom"). Different constraint grammars may be active at different times. For example, a constraint grammar may be associated with a particular application program 155 and may be activated when the user opens the application program and deactivated when the user closes the application program. The recognizer 215 discards any hypothesis that does not comply with an active constraint grammar. In addition, the recognizer 215 may adjust the score of a hypothesis associated with a particular constraint grammar based on characteristics of the constraint grammar.

Figure 4A:
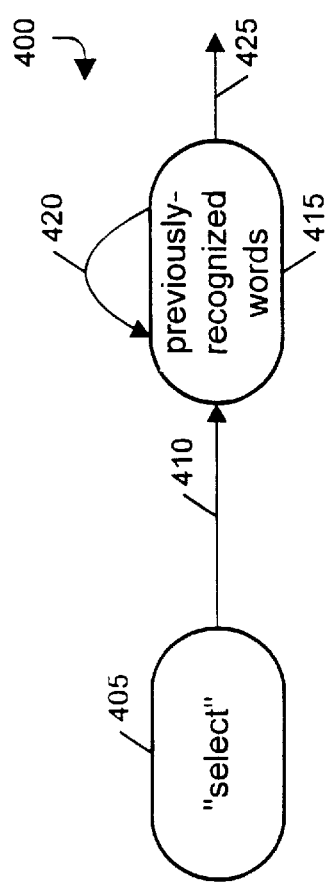
FIGS. 4A and 4B are state diagrams of a constraint grammar.
Figure 4B:
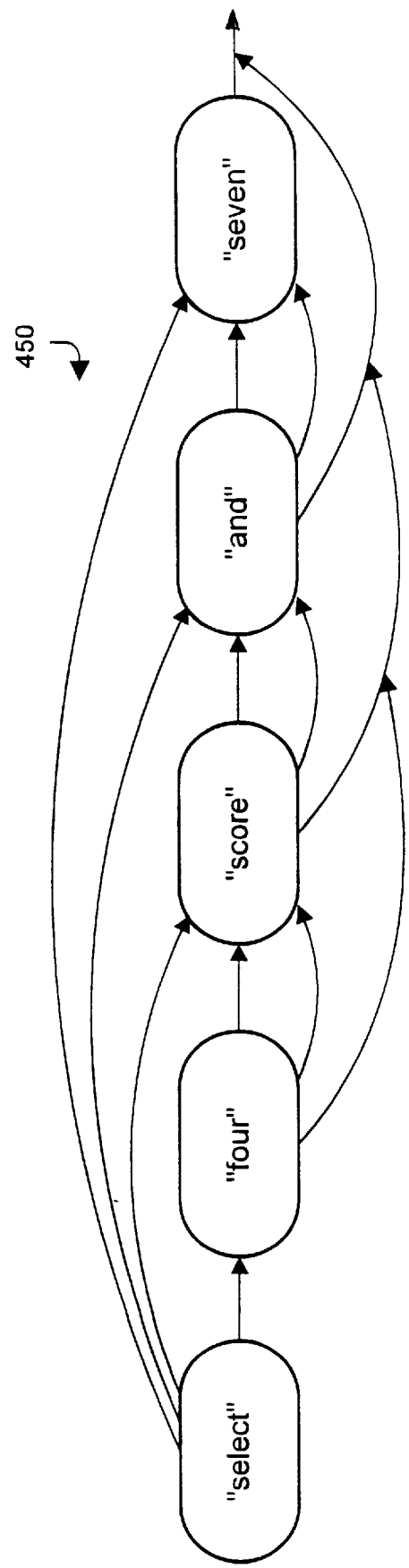

As shown in FIG. 4A, which illustrates the constraint grammar for a "select" command used to select previously recognized text, a constraint grammar may be illustrated as a state diagram 400. The "select" command includes the word "select" followed by one more previously-recognized words, with the words being in the order in which they were previously recognized. The first state 405 of the constraint grammar indicates that the first word of the select command must be "select". After the word "select", the constraint grammar permits a transition along a path 410 to a second state 415 that requires the next word in the command to be a previously-recognized word. A path 420, which returns to the second state 415, indicates that the command may include additional previously-recognized words. A path 425, which exits the second state 415 and completes the command, indicates that the command may include only previously-recognized words. FIG. 4B illustrates the state diagram 450 of the constraint grammar for the select command when a previously-recognized utterance is "four score and seven". This state diagram could be expanded to include words from additional utterances.

The constraint grammar also may be expressed in Backus-Naur Form (BNF) or Extended BNF (EBNF). In EBNF, the grammar for the "Select" command is:

<recognition result>::=Select <word>, where

<word>::=[PRW$^1$[PRW$^2$[PRW$^3$ ... PRW$^n$]]]|[PRW$^2$[PRW$^3$ ... PRW$^n$]] ... PRW$^n$, "PRW$^i$" is the previously-recognized word i,
[ ] means optional,
< > means a rule,
| means an OR function, and
::= means "is defined as" or "is".

As illustrated in FIGS. 4A and 4B, this notation indicates that "select" may be followed by any ordered sequence of previously-recognized words. This grammar does not permit optional or alternate words. In some instances, the grammar may be modified to permit optional words (e.g., an optional "and" to permit "four score and seven" or "four score seven") or alternate words or phrases (e.g., "four score and seven" or "eighty seven"). Constraint grammars are discussed further in U.S. patent application Ser. No. 08/559, 207, filed Nov. 13, 1995 and entitled "CONTINUOUS RECOGNITION OF SPEECH AND COMMANDS", which is incorporated by reference.

One constraint grammar 225 that may be used by the speech recognition software 160 is a large vocabulary dictation grammar. The large vocabulary dictation grammar, identifies words included in the active vocabulary 230, which is the vocabulary of words known to the software. The large vocabulary dictation grammar also includes a language model that indicates the frequency with which words occur. As discussed below, the recognizer 215 uses a dynamic interpolation technique to combine the results of a collection of language models to produce a single language model result. Other constraint grammars 225 include an in-line dictation macros grammar for dictation commands, such as "/CAP" to capitalize a word and "/New-Paragraph" to start a new paragraph; a select X Y Z grammar used in selecting text, an error correction commands grammar; a dictation editing grammar, an application command and control grammar that may be used to control a particular application program 155; a global command and control grammar that may be used to control the operating system 150 and the speech recognition software 160; a menu and dialog tracking grammar that may be used to manipulate menus; and a keyboard control grammar that permits the use of speech in place of input devices, such as the keyboard 115 or the mouse 110.

The active vocabulary 230 uses a pronunciation model in which each word is represented by a series of phonemes that comprise the phonetic spelling of the word. In particular, each phoneme is represented as a triphone that includes three nodes. A triphone is a context-dependent phoneme. For example, the triphone "abc" represents the phoneme "b" in the context of the phonemes "a" and "c", with the phoneme "b" being preceded by the phoneme "a" and followed by the phoneme "c".

One or more vocabulary files may be associated with each user. The vocabulary files contain all of the words, pronunciations and language model information for the user. Dictation and command grammars may be split between vocabulary files to optimize language model information and memory use, and to keep each single vocabulary file under 64,000 words. There also is a set of system vocabularies.

Each dictation topic (e.g., "medical" or "legal") has its own vocabulary file. This allows the active dictation vocabulary to grow almost as large as 64,000 words, and allows each dictation topic to have its own language model. A dictation topic will consists of a set of words which represent the active vocabulary. There are around 30,000 words in each topic. This represents the words which are considered for normal recognition.

Separate acoustic models 235 are provided for each user of the system. Initially speaker-independent acoustic models of male or female speech are adapted to a particular user's speech using an enrollment program. The acoustic models may be further adapted as the system is used. The acoustic models are maintained in a file separate from the active vocabulary 230.

The acoustic models 235 represent each triphone node as a mixture of Gaussian probability density functions ("PDFs"). For example, node "i" of a triphone "abc" may be represented as ab$^i$c:

$$ab^ic = \sum_k w_k N(\mu_k, c_k),$$

where each $W_k$ is a mixture weight, $$\sum_k w_k = 1,$$

$\mu_k$ is a mean vector for the probability density function ("PDF") $N_k$, and $c_k$ is the covariance matrix for the PDF $N_k$. Like the frames in the sequence of frames, the vectors $\mu_k$ each include 24 parameters. The matrices $c_k$ are twenty four by twenty four matrices. Each triphone node may be represented as a mixture of up to sixteen different PDFs.

A particular PDF may be used in the representation of multiple triphone nodes. Accordingly, the acoustic models represent each triphone node as a collection of mixture weights $w_k$ associated with up to sixteen different PDFs $N_k$ and separately represent each PDF $N_k$ using a mean vector $\mu_k$ and a covariance matrix $c_k$.

The recognizer 215 operates in parallel with a pre-filtering procedure 240. Upon initiating processing of an utterance, the recognizer requests from the pre-filtering procedure a list of words that may have been spoken as the first word of the utterance (i.e., words that may correspond to the first and subsequent frames of the utterance). The pre-filtering procedure performs a coarse comparison of the sequence of frames with the active vocabulary 230 to identify a subset of the vocabulary for which a more extensive comparison using the recognizer is justified.

Figure 5:
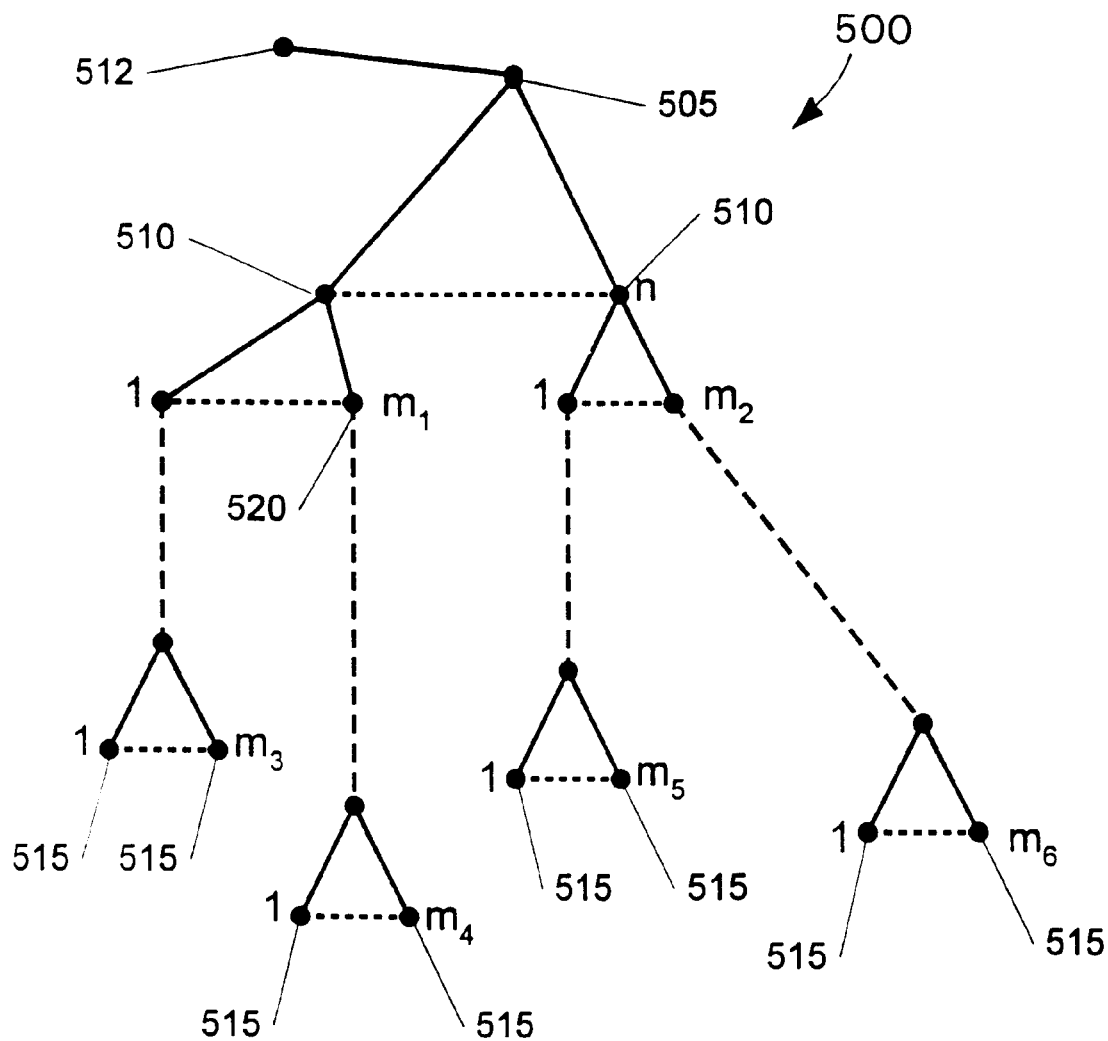
FIG. 5 is a graph of a lexical tree.
Figure 6:
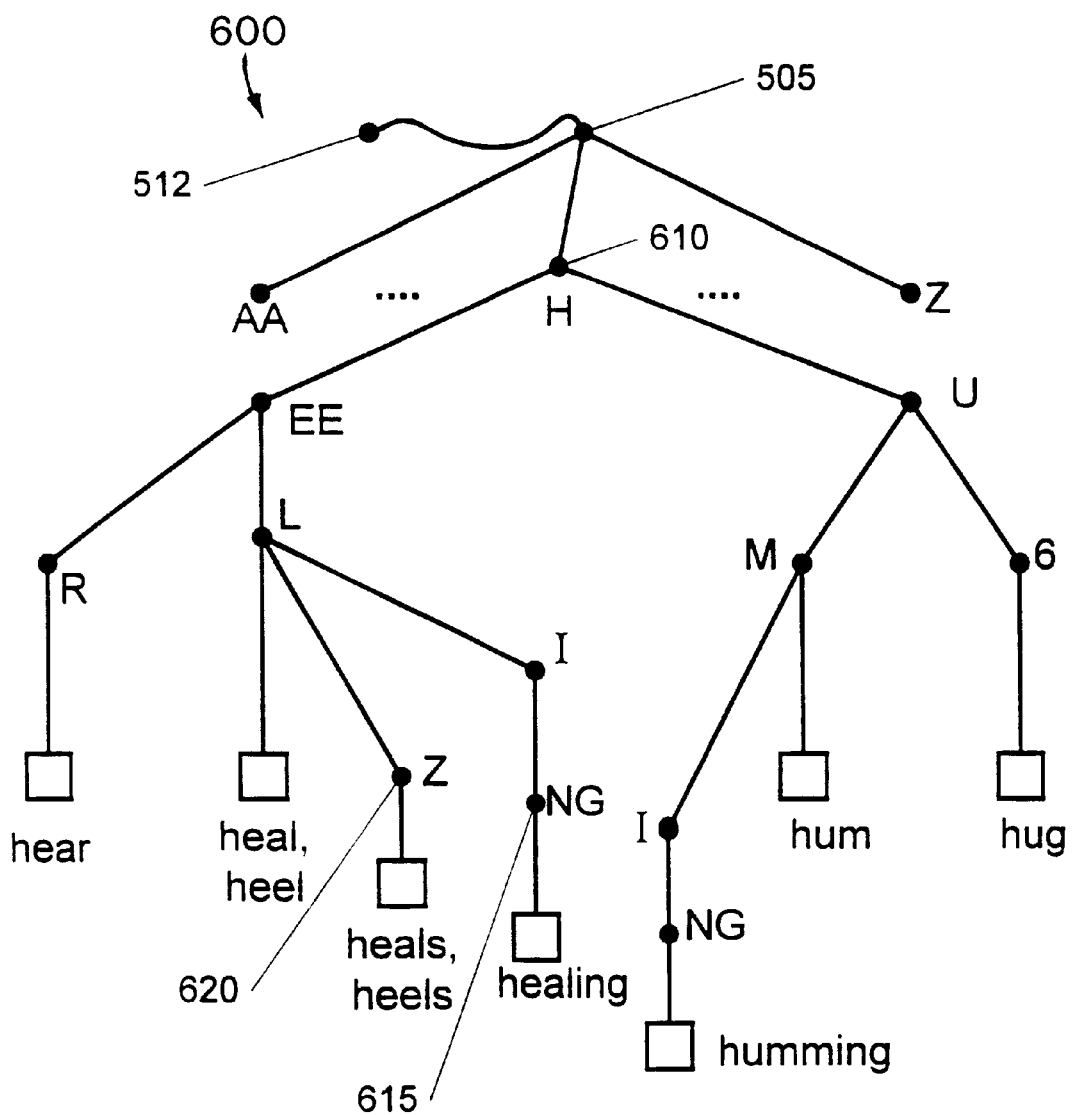
FIG. 6 is a graph of a portion of the lexical tree of FIG. 5.

Referring to FIGS. 5 and 6, the pre-filtering procedure 240 uses a lexical tree 500 that is initialized before processing begins. The lexical tree represents the active vocabulary 230 based on the phonetic relationships between words in the vocabulary. The lexical tree includes a root node 505 that represents new words entering the lexical tree. From the root node 505, the tree expands to a group 510 of nodes that correspond to phonemes with which words start. A silence node 512 that represents silence also may be reached from the root node 505.

Each node in the group 510 represents a phoneme that appears at the beginning of one or more words. For example, in the portion 600 of the lexical tree 500 illustrated in FIG. 6, a node 610 corresponds to all words in the vocabulary that start with the phoneme "H". Together, the nodes in the group 510 include representations of the starting phoneme of every word in the vocabulary.

The lexical tree continues to expand until it reaches leaf nodes 515 that represent the actual words of the vocabulary. For example, as indicated by the square marker, leaf node 615 of FIG. 6 corresponds to the word "healing". An internal node of the tree also may represent a word of the vocabulary. For example, the node 520 might represent a particular vocabulary word in addition to representing the first two phonemes of other vocabulary words. Similarly, the leaf node 620 of FIG. 6 corresponds to the words "heal" and "heel" while also corresponding to the first three phonemes of the words "heals", "heels" and "healing". Node 620 also illustrates that, since multiple words may have the same phonetic spelling, a leaf node may correspond to more than one word. As illustrated in FIG. 6, leaf nodes may appear at different levels within the lexical tree. Leaf nodes also may correspond to commands. For example, a leaf node may correspond to the word "select" and to the command "SELECT". As noted above, commands may be associated with particular constraint grammars 225.

Figure 7:
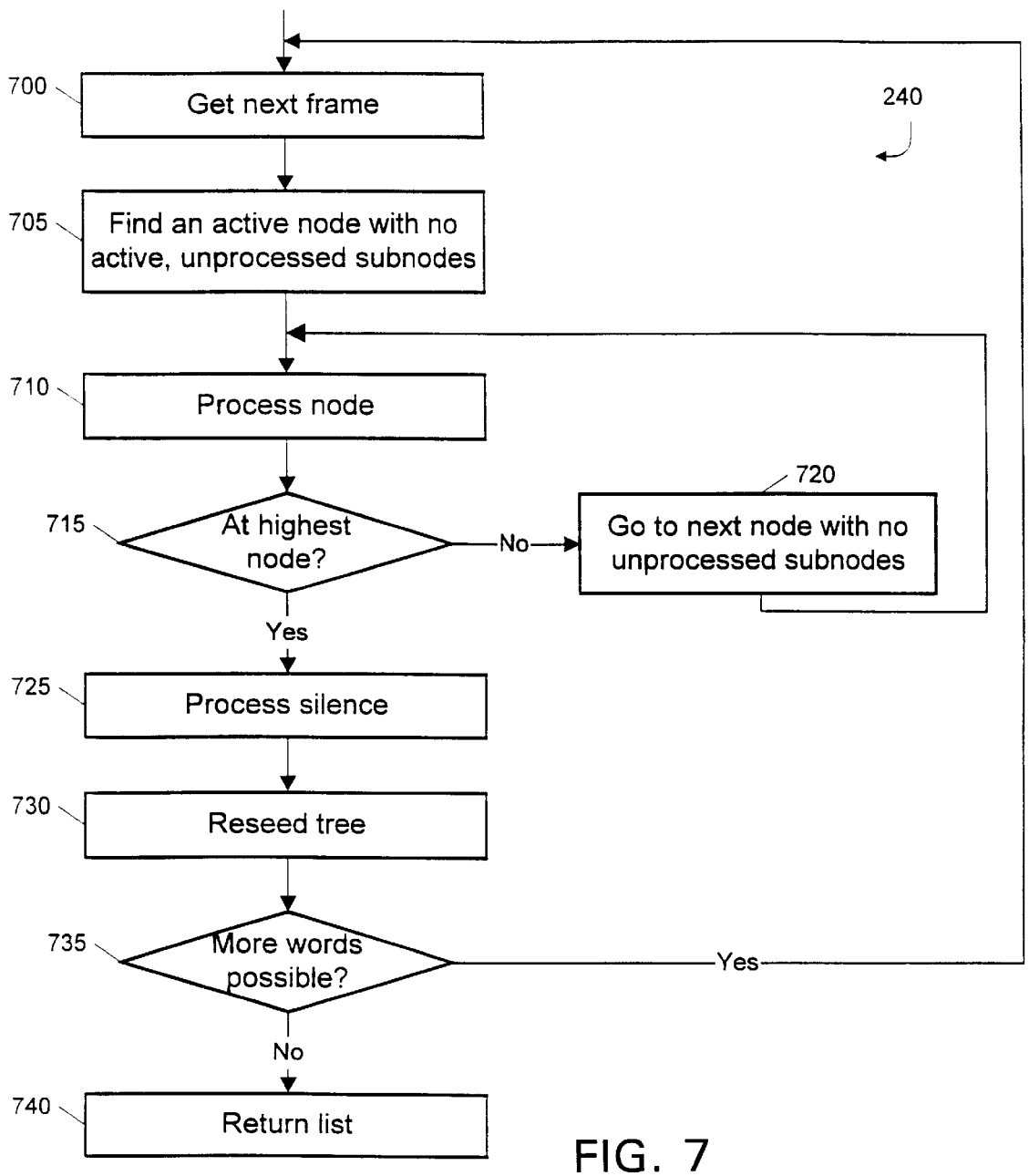
FIG. 7 is a flow chart of a pre-filtering procedure performed by the software of FIG. 2.

Operation of the pre-filtering procedure 240 is illustrated in FIG. 7. The pre-filtering procedure begins by retrieving the next frame of parameters for an utterance (step 700). Immediately after initialization, the next frame will be the first frame for the utterance. Thereafter, the next frame will be the frame following the last frame that was processed by the pre-filtering procedure when the pre-filtering procedure was last called. The pre-filtering procedure does not reinitialize the lexical tree between requests for list of words. Accordingly, the state of the lexical tree when a list of words is requested corresponds to the state of the lexical tree after a previous list of words was returned.

After retrieving a frame of data, the pre-filtering procedure finds an active node in the tree with no unprocessed active successors (step 705). Successors of a node also may be referred to as subnodes of the node. When the lexical tree is initialized, the silence node 512 is the only active node.

Next, the pre-filtering procedure processes the current node (step 710) according to a node-processing procedure 1100 that is discussed below with reference to FIG. 11. The node-processing procedure determines whether the node should spawn additional active nodes and whether the node should be rendered inactive. If the node is a leaf node, the node-processing procedure also determines whether the word corresponding to the node should be added to a word list for a time associated with the node.

After processing the node (step 710), the pre-filtering procedure determines whether the node is the highest node in the tree (i.e., the root node) (step 715). If the node is not the highest node, then the pre-filtering procedure goes to the next node having no unprocessed active subnodes (step 720) and processes that node (step 710). When searching for the next node to process, the pre-filtering procedure considers inactive nodes having active subnodes or active siblings.

If the processed node is the highest active node (step 715), then the pre-filtering procedure processes the silence node 512 (step 725). In general, the silence node is processed by comparing a frame to a model for silence and adding the resulting score to the minimum of the current score for the silence node and the score for the root node 505.

Next, the pre-filtering procedure reseeds the lexical tree (step 730). The pre-filtering procedure reseeds the tree whenever the silence node 512 is active or a word was produced by a leaf node of the lexical tree, regardless of whether the word was added to the list of words. The pre-filtering procedure reseeds the tree by replacing the score for the root node 505 with the minimum of the score for the silence node 512 and the scores for any words produced by leaf nodes of the lexical tree for the current frame. If the silence node is inactive and no leaf node has produced a word, then the pre-filtering procedure replaces the score for the root node 505 with a bad score (i.e., a score having a value larger than a pruning threshold).

Next, the pre-filtering procedure determines whether more words may be added to the word list for the requested time (step 735). If there are no active nodes in the lexical tree corresponding to speech that started at, before, or slightly after the start time for which the list was requested, and if the last frame to be processed corresponds to a time that is slightly after the start time for which the list was requested, then no more words may be added to the word list. A word produced by the lexical tree is added to the list of words corresponding to the start time of the word and to lists of words corresponding to times that precede and follow the start time of the word. It is for this reason that the pre-filtering procedure waits until there are no active nodes in the tree corresponding to speech that started slightly after the start time for the list of words. If more words may be added, then the pre-filtering procedure retrieves the next frame of parameters (step 700) and repeats the steps discussed above.

If words cannot be added to the word list (step 735), then the pre-filtering procedure returns the word list (step 740) to the recognizer 215. If the word list includes more than a predefined number of words, then the pre-filtering procedure removes words from the list prior to returning the list. The pre-filtering procedure removes the words that are least likely to correspond to the user's speech and removes enough words to reduce the number of words on the list to the predefined number. The procedure also deletes any lists of words for times prior to the requested start time.

Each node of the lexical tree 500 (FIG. 5) represents a sequence of states for a particular phoneme. For example, FIG. 8A illustrates a node 800 that includes a first state 805, a second state 810, and a third state 815. A comparison with a frame of parameters may cause the score in a particular state to remain in the state (through a path 820). A score remains in the state when the score, after being adjusted based on a comparison with a model for the state, is better than a score passed from a preceding state or node, or when no score is passed from a preceding state or node. The comparison also may cause the score to be passed to a subsequent state through a path 825. A score is passed to a subsequent state when the score, after being adjusted based on a comparison with a model for the subsequent state, is better than the score in the subsequent state, or when no score is associated with the subsequent state. The score for the third state 815 may be passed to one or more subsequent nodes through a path 830.

Referring to FIG. 8B, the node 512 that corresponds to silence is represented by a single state 840. Each comparison with a frame of parameters may cause a score in the node to remain in the state 840 (through the path 845) and also may cause the score to be passed to the root node 505 through a path 850.

Referring to FIG. 8C, the root node 505 is represented by a single state 860. Comparison with a frame causes the score in the node to be passed to one or more subsequent nodes (including the silence node 512) through a path 865.

Each state of a node may be represented by four values: a score, a starting time, a leaving penalty, and a staying penalty. The score represents the likelihood that a series of frames has placed the lexical tree in the state (i.e., the probability that the series of frames corresponds to the word or portion of a word to which the state corresponds). The scores are maintained as negative logarithmic values.

The starting time identifies the hypothesized time at which the user began to speak the word or words represented by the state. In particular, the starting time identifies the time at which the score associated with the state entered the lexical tree (i.e., the time at which the score was passed from the state 840 along the path 850).

The leaving and staying penalties are fixed values associated with the state. The staying penalty is added to any score that stays in the state. The staying penalty is related inversely to the length of the sound represented by the state and to the length of the phoneme represented by the node to which the state belongs. For example, the staying penalty could be proportional to $-\log(1-1/d_{avg})$, where $d_{avg}$ is the average duration, in frames, of the sound represented by the state. Thus, the staying penalty has a relatively large value when the sound corresponding to the state occurs for only a small amount of time and a relatively small value when the sound corresponding to the state occurs for a large amount of time.

The leaving penalty is added to any score that exits the state, and includes a duration component and a language model component. The duration component is related directly to the length of the sound represented by the state and to the length of the phoneme represented by the node to which the state belongs. For example, the duration component of the leaving penalty could be proportional to $-\log(1/d_{avg})$. Thus, the duration component of the leaving penalty has a relatively large value when the sound corresponding to the state occurs for a large amount of time and a relatively small value when the sound corresponding to the state occurs for a small amount of time.

The language model components of the leaving penalties for all states in a particular node together represent a language model score for the phoneme associated with that node. The language model score represents the likelihood that a word including the phoneme will occur in speech. The language model score included in the leaving penalties for a node is the increase in the best language model score for the branch of the lexical tree that begins with the node relative to the branch of the lexical tree that begins with the node's parent.

The following discussion assumes that there are no leaving or staying penalties associated with the state 840 or the state 860. The same result could be achieved by setting the leaving and staying penalties for states 840 and 860 equal to zero. The following discussion also assumes that the first frame is the first frame that may correspond to speech instead of silence.

FIG. 9 provides a simplified example of how scores propagate through the lexical tree. Before the first frame is retrieved (row 900), state 840 (which corresponds to silence) has a score of 0 and no other nodes are active. The score of 0 means that there is a one hundred percent probability that the system is starting from silence.

After the first frame is retrieved (row 905), the score for the state 840 ($S_{A1}$) is set equal to the acoustic score ($A_{A1}$) resulting from an acoustic match of the first frame with an acoustic model corresponding to the state 840 (i.e., the acoustic model for silence). Thus, the score for the state 840 ($S_{A1}$) is set equal to the likelihood that the first frame corresponds to silence.

Retrieval of the first frame also causes the state 805 to become an active state. Assuming that the node 800 corresponds to a phoneme that starts a word, the score for the state 805 ($S_{B1}$) is set equal to the acoustic score ($A_{B1}$) resulting from an acoustic match of the first frame with the acoustic model corresponding to the state 805. Thus, the score for the state 805 ($S_{B1}$) is set equal to the likelihood that the first frame corresponds to the state 805. The starting time for the state 805 is set equal the time associated with the first frame. This value for the starting time indicates that the score at state 805 represents a word that started at a time corresponding to the first frame. The starting time moves with the score as the score propagates through the lexical tree.

After the second frame is retrieved (row 910), the score for the state 840 ($S_{A2}$) is set equal to the sum of the previous score for the state ($S_{A1}$) and the acoustic score ($A_{A2}$) resulting from an acoustic match of the second frame with the acoustic model for silence:

$$S_{A2}=S_{A1}+A_{A2}=A_{A1}+A_{A2}.$$

As noted above, each of the scores corresponds to a negative logarithmic probability. Accordingly, adding scores together corresponds to multiplying the probabilities. Thus, the score for the state 840 ($S_{A2}$) equals the likelihood that both of the first and second frames correspond to silence. This process is repeated for subsequent frames (e.g., lines 915 and 920) so that the score for the state 840 at a frame "n" ($S_{An}$) equals:

$$S_{An} = S_{An-1} + A_{An} = \sum_{m=1}^{n} A_{Am}.$$

This expression assumes that the silence node 512 is not reseeded from the root node 505. If reseeding occurs at a frame n, then the value of $S_{An-1}$ would be replaced by the score in the root node 505 for the frame n−1.

After the second frame is retrieved, the score for the state 805 ($S_{B2}$) is set equal to:

$$S_{B2}=\min(S_{B1}+\text{stay}_B, S_{A1})+A_{B2},$$

where $A_{B2}$ is the acoustic score resulting from an acoustic match of the second frame with the acoustic model corresponding to state 805 and $\text{stay}_B$ is the staying penalty for state 805. The score for state 805 ($S_{B2}$) corresponds to the more likely of two alternatives: (1) the first frame was silence and the second frame was the sound represented by the state 805 or (2) both of the first and second frames were the sound represented by the state 805. The first alternative corresponds to a transition from state 840 to state 805 along the path 850. The second alternative corresponds to a transition from state 805 back to state 805 along path 820. When the first alternative is the more likely, the starting time corresponding to the first frame that was stored previously for the state 805 is replaced by a value corresponding to the second frame. This value indicates that the score at state 805 represents a word that started with the second frame.

After the second frame is retrieved, the state 810 becomes an active state. The score for the state 810 ($S_{C2}$) is set equal to:

$$S_{C2}=S_{B1}+\text{leave}_B+A_{C2},$$

where $A_{C2}$ is the acoustic score resulting from an acoustic match of the second frame with the acoustic model corresponding to state 810 and $\text{leave}_B$ is the leaving penalty for the state 805. Similarly, $\text{leave}_C$ and $\text{leave}_D$ are leaving penalties for, respectively, states 810 and 815. The sum of language model components of $\text{leave}_B$, $\text{leave}_C$ and $\text{leave}_D$ represents the language model score for the phoneme represented by the node 800.

The methodology for determining state scores for states other than the silence state can be expressed more generally as:

$$S_{i,j} = \min(S_{i,j-1} + \text{stay}_i, S_{i-1,j-1} + \text{leave}_{j-1}) + A_{i,j}.$$

for i greater than zero (where i equals zero corresponds to silence), and with the boundary condition that the score for an inactive state equals infinity or some sufficiently large value. The starting time for the state may be represented as:

$$t_{i,j} = t_{i,j-1} \text{ for } S_{i,j-1} + \text{stay}_i \leq S_{i-1, j-1} + \text{leave}_{j-1},$$

or $$t_{i,j} = t_{i-1, j-1} \text{ for } S_{i, j-1} + \text{stay}_i > S_{i-1, j-1} + \text{leave}_{j-1},$$

for i and j greater than zero and with the boundary condition that the time value for a newly active state represents the frame at which the state became active. As previously noted, state scores for the silence state may be determined as:

$$S_{0,j} = S_{0,j-1} + A_{0,j} = \sum_{m=1}^{j} A_{0,m}.$$

with the boundary condition that $S_{0,0}$ equals zero. An even more general form, in which the scores are expressed as functions of the various parameters, is illustrated in FIG. 10.

Figure 11:
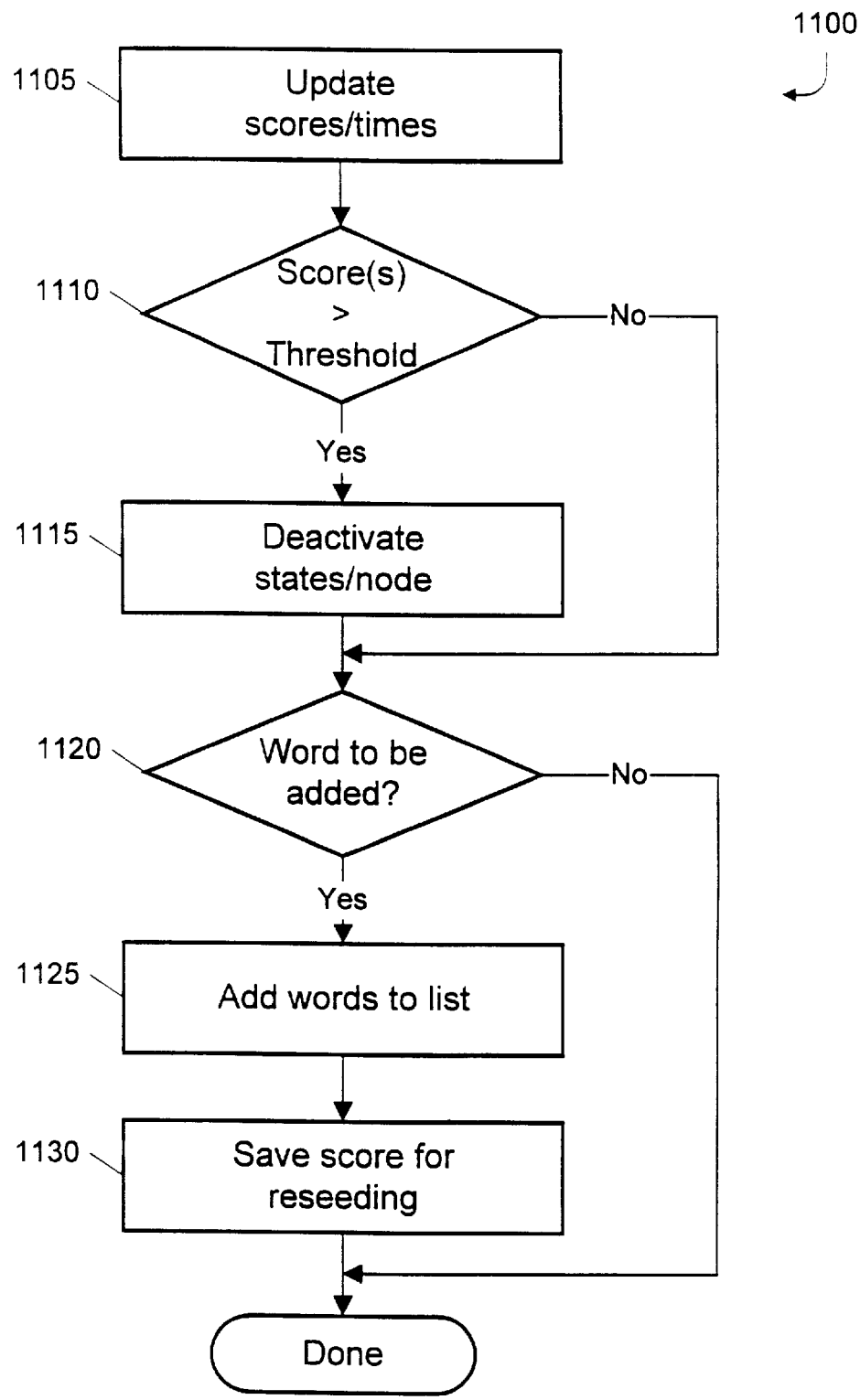
FIG. 11 is a flow chart of a procedure for processing nodes of a lexical tree.

Referring to FIG. 11, a node may be processed according to a node-processing procedure 1100. Initially, the node-processing procedure updates the scores and time values for each state of the node (step 1105). The node-processing procedure updates the scores and time values by generating acoustic scores and using the equations discussed above.

When the last state of the node was active prior to updating the scores for the node, the node-processing procedure uses the score for the last state to generate scores for any inactive subnodes of the node. If the generated score for a subnode does not exceed a pruning threshold, then the node-processing procedure activates that subnode and provides the subnode with the generated score.

Next, the node-processing procedure determines whether the score of any state of the node exceeds the pruning threshold (step 1110). When a score exceeds the pruning threshold, the likelihood that the word represented by the score was spoken is deemed to be too small to merit further consideration. For this reason, the procedure prunes the lexical tree by deactivating any state having a score that exceeds the pruning threshold (step 1115). If every state of the node is deactivated, then the node-processing procedure also deactivates the node. The node-processing procedure may deactivate a node or state by deleting a record associated with the node or state, or by indicating in the record that the node or state is inactive. Similarly, the node-processing procedure may activate a node or state by creating a record and associating the record with the node or state, or by indicating in an existing record that the node or state is active. The procedure may use a dynamic pruning threshold that accounts for variations in the average or best score in the lexical tree at any given time.

Next, the node-processing procedure determines whether a word is to be added to a list of words (step 1120). A word is added to the list of words when the node being processed corresponds to the last phoneme of a word, a score has been propagated out of the last state of the node, and the score is less than a list threshold. Before comparing the score to the list threshold, the node-processing procedure adds a language model score to the score. The language model score corresponds to the difference between the language model score for the word and the incremental language model score that is already included in the score. In general, the list threshold has a lower value than the pruning threshold. If the node being processed corresponds to the last phoneme of multiple words having the same phonetic spelling, then all of the words to which the node corresponds are added to the list of words.

If the noted conditions are met, the node-processing procedure adds the word or words to the list (step 1125). A word is stored in the list of words along with the score propagated out of the last state. If the word is on the list already, then the node-processing procedure stores with the list the better of the score already stored with the list or the score propagated out of the last state. The scores for words in a list of words are returned along with the list of words. The recognizer 215 uses these scores in making the detailed match.

The node-processing procedure also adds the word to lists of words for times that precede or follow the starting time to account for possible inaccuracies in the starting time of the word that may result from selecting the better of a score that remains in a state or a score propagated from a prior state. Spreading the word across multiple lists ensures that these inaccuracies will not impinge on the accuracy of the speech recognition system. The node-processing procedure spreads the word across multiple lists based on the length of the word.

After adding a word to the list of words (step 1125), the node-processing procedure saves the score associated with the word as a reseeding score for use in reseeding the tree (step 1130). Production of a word by the lexical tree means that the current frame may correspond to the last frame of the word (with the probability of such a correspondence being reflected by the score associated with the word). This means that the next frame may correspond to the beginning of a word or to silence resulting from a pause between words. The pre-filtering procedure reseeds the tree (step 730 of FIG. 7) to account for this possibility.

For a given frame, multiple nodes may produce words. However, the tree only needs to be reseeded once. To account for this, the node-processing procedure only saves the score associated with a word ($S_w$) as the reseeding score ($S_{RS}$) if the word is the first word to be generated by the tree for the current frame of if the word score is less than the score for all other words generated by previously-processed nodes for the current frame ($S_{RS}'$):

$$S_{RS} = \min(S_w, S_{RS}').$$

Saving only the lowest score (i.e., the score indicating the highest probability that the current frame was the last frame of a word) ensures that the tree will be reseeded using the highest probability that the next frame is the first frame of a new word.

To reseed the tree (step 730 of FIG. 7), the pre-filtering procedure activates the root node 505 and associates the minimum of the reseeding score ($S_{RS}$) and the score for the silence node 512 with the root node. During processing of the next frame, the active root node 505 may be used to activate nodes in the group 510 or to activate the silence node 512.

Processing of the node is complete after the node-processing procedure saves a score for use in reseeding the tree (step 1130), or if no word is to be added to the list of words (step 1120). The lexical tree pre-filtering procedure is discussed in detail in U.S. patent application Ser. No.

08/701,393, filed on Aug. 22, 1996 and entitled "LEXICAL TREE PRE-FILTERING IN SPEECH RECOGNITION", which is incorporated by reference.

After the pre-filtering procedure responds with the requested list of words, the recognizer initiates a hypothesis for each word from the list and compares acoustic models for the word to the frames of parameters representing the utterance. The recognizer uses the results of these comparisons to generate scores for the hypotheses. Hypotheses having excessive scores are eliminated from further consideration. As noted above, hypotheses that comply with no active constraint grammar also are eliminated.

When the recognizer determines that a word of a hypothesis has ended, the recognizer requests from the pre-filtering procedure a list of words that may have been spoken just after the ending-time of the word. The recognizer then generates a new hypotheses for each word on the list, where the new hypothesis includes the words of the old hypothesis plus the new word.

In generating the score for a hypothesis, the recognizer uses acoustic scores for words of the hypothesis, a language model score that indicates the likelihood that words of the hypothesis are used together, and scores provided for each word of the hypothesis by the pre-filtering procedure. The scores provided by the pre-filtering procedure include components corresponding to a crude acoustic comparison and a language model score indicative of the likelihood that a word is used, independently of context. The recognizer may eliminate any hypothesis that is associated with a constraint grammar (e.g., a command hypothesis), but does not comply with the constraint grammar.

Figure 12:
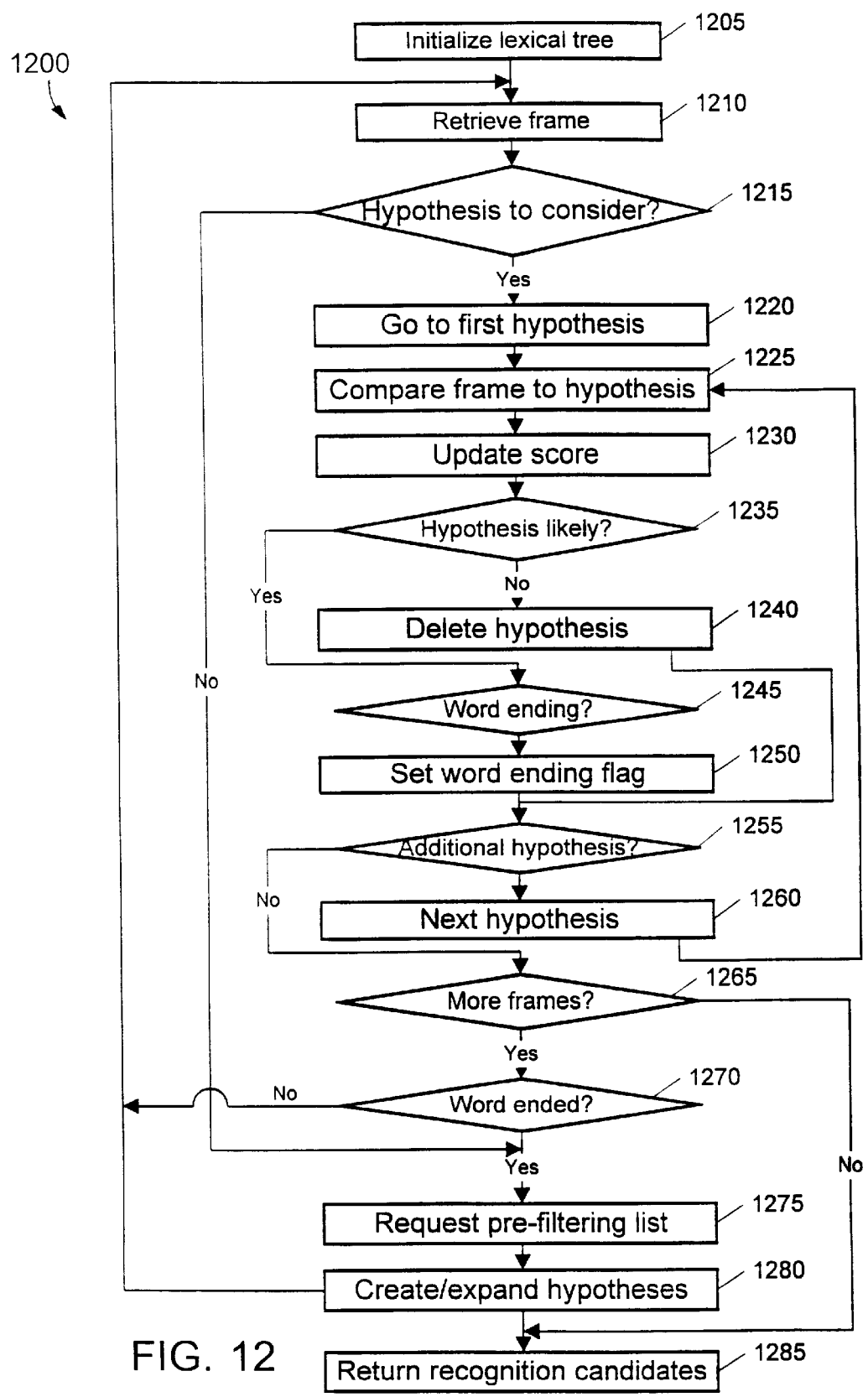
FIGS. 12–14 are flow charts of speech recognition procedures.

Referring to FIG. 12, the recognizer 215 operates according to a procedure 1200. First, prior to processing, the recognizer 215 initializes the lexical tree 500 as described above (step 1205). The recognizer 215 then retrieves a frame of parameters (step 1210) and determines whether there are hypotheses to be considered for the frame (step 1215). The first frame always corresponds to silence so that there are no hypotheses to be considered for the first frame.

If hypotheses need to be considered for the frame (step 1215), then the recognizer 215 goes to the first hypothesis (step 1220). The recognizer then compares the frame to acoustic models 235 for the last word of the hypothesis (step 1225) and, based on the comparison, updates a score associated with the hypothesis (step 1230).

After updating the score (step 1230), the recognizer determines whether the user was likely to have spoken the word or words corresponding to the hypothesis (step 1235). The recognizer makes this determination by comparing the current score for the hypothesis to a threshold value. If the score exceeds the threshold value, then the recognizer 215 determines that the hypothesis is too unlikely to merit further consideration and deletes the hypothesis (step 1240).

If the recognizer determines that the word or words corresponding to the hypothesis were likely to have been spoken by the user, then the recognizer determines whether the last word of the hypothesis is ending (step 1245). The recognizer determines that a word is ending when the frame corresponds to the last component of the model for the word. If the recognizer determines that a word is ending (step 1245), the recognizer sets a flag that indicates that the next frame may correspond to the beginning of a word (step 1250).

If there are additional hypotheses to be considered for the frame (step 1255), then the recognizer selects the next hypothesis (step 1260) and repeats the comparison (step 1225) and other steps. If there are no more hypotheses to be considered for the frame (step 1255), then the recognizer determines whether there are more frames to be considered for the utterance (step 1265). The recognizer determines that there are more frames to be considered when two conditions are met. First, more frames must be available. Second, the best scoring node for the current frame or for one or more of a predetermined number of immediately preceding frames must have been a node other than the silence node (i.e., the utterance has ended when the silence node is the best scoring node for the current frame and for a predetermined number of consecutive preceding frames).

If there are more frames to be considered (step 1265) and the flag indicating that a word has ended is set (step 1270), or if there were no hypotheses to be considered for the frame (step 1215), then the recognizer requests from the pre-filtering procedure 240 a list of words that may start with the next frame (step 1275).

Upon receiving the list of words from the pre-filtering procedure, the recognizer uses the list of words to create hypotheses or to expand any hypothesis for which a word has ended (step 1280). Each word in the list of words has an associated score. Prior to adding a list word to a hypothesis, the recognizer modifies the list score ($S_L$) for the word to produce a modified list score ($S_{ML}$) as:

$$S_{ML} = S_L + L_C - L_L,$$

where $L_C$ is a language model score that represents the frequency with which the pair of words that includes the list word and the immediately preceding word in the hypothesis are used together in speech, and $L_L$ is a language model score included in the list score and corresponds to the frequency with which the list word is used in speech, without reference to context. The recognizer then adds the modified list score to the score for the hypothesis and compares the result to a threshold value. If the result is less than the threshold value, then the recognizer maintains the hypothesis. Otherwise, the recognizer determines that the hypothesis does not merit further consideration and abandons the hypothesis. As an additional part of creating or expanding the hypotheses, the recognizer compares the hypotheses to the active constraint grammars 225 and abandons any hypothesis that corresponds to no active constraint grammar. The recognizer then retrieves the next frame (step 1210) and repeats the procedure.

If there are no more speech frames to process, then the recognizer 215 provides the most likely hypotheses to the control/interface module 220 as recognition candidates (step 1285).

The control/interface module 220 controls operation of the speech recognition software and provides an interface to other software or to the user. The control/interface module receives the list of recognition candidates for each utterance from the recognizer. Recognition candidates may correspond to dictated text, speech recognition commands, or external commands. When the best-scoring recognition candidate corresponds to dictated text, the control/interface module provides the text to an active application, such as a word processor. The control/interface module also may display the best-scoring recognition candidate to the user through a graphical user interface. When the best-scoring recognition candidate is a command, the control/interface module 220 implements the command. For example, the control/interface module may control operation of the speech recognition software in response to speech recognition commands and may forward other commands to the appropriate software.

The control/interface module also controls the active vocabulary, acoustic models, and constraint grammars that are used by the recognizer. For example, when the speech recognition software is being used in conjunction with a particular application (e.g., Microsoft Word), the control/interface module updates the active vocabulary to include command words associated with that application and activates constraint grammars associated with the application.

Other functions provided by the control/interface module include an enrollment program, a vocabulary builder, and a vocabulary manager. The enrollment program collects acoustic information from a user and trains or adapts a user's models based on that information. The vocabulary builder optimizes the language model of a specific topic by scanning user supplied text. The vocabulary manager is a developer tool which is used to browse and manipulate vocabularies, grammars and macros. Each function of the control/interface module 220 may be implemented as an executable program that is separate from the main speech recognition software.

A complete dictation vocabulary consists of the active vocabulary plus a backup dictionary 245. The backup dictionary may include files that contain user-specific backup vocabulary words and system-wide backup vocabulary words. User-specific backup vocabulary words include words which a user has created while using the speech recognition software (up to a limit of 64,000 words). These words are stored in vocabulary files for the user and for the dictation, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary. In general, the backup dictionary includes substantially more words than are included in the active vocabulary. For example, when the active vocabulary 230 has 60,000 or so entries, the backup dictionary may have 200,000 or so entries. The active vocabulary 230 is a dynamic vocabulary in that entries may be added or subtracted from the active vocabulary over time. For example, when the user indicates that an error has been made and the control/interface module 220 uses the backup dictionary 245 to correct the error, a new word from the backup dictionary 245 may be added to the active vocabulary 230 to reduce the likelihood that the misrecognition will be repeated.

In addition to the user-specific backup dictionaries noted above, there is a system-wide backup dictionary. The system-wide backup dictionary contains all the words known to the system, including words which may currently be in an active vocabulary.

The control/interface module implements error correction procedures of the software 160. During error correction, word searches of the backup vocabularies start with the user-specific backup dictionary and then check the system-wide backup dictionary. The backup dictionaries also are searched when there are new words in text that a user has typed.

As noted above, the recognizer 215 uses language model scores as a factor in identifying words that correspond to an utterance. As also noted above, the recognizer 215 uses a dynamic interpolation technique to combine scores from a collection of language models to produce a single language model score. The dynamic interpolation technique dynamically assigns weights to the scores of each model in a way that emphasizes the most effective language models.

Figure 13:
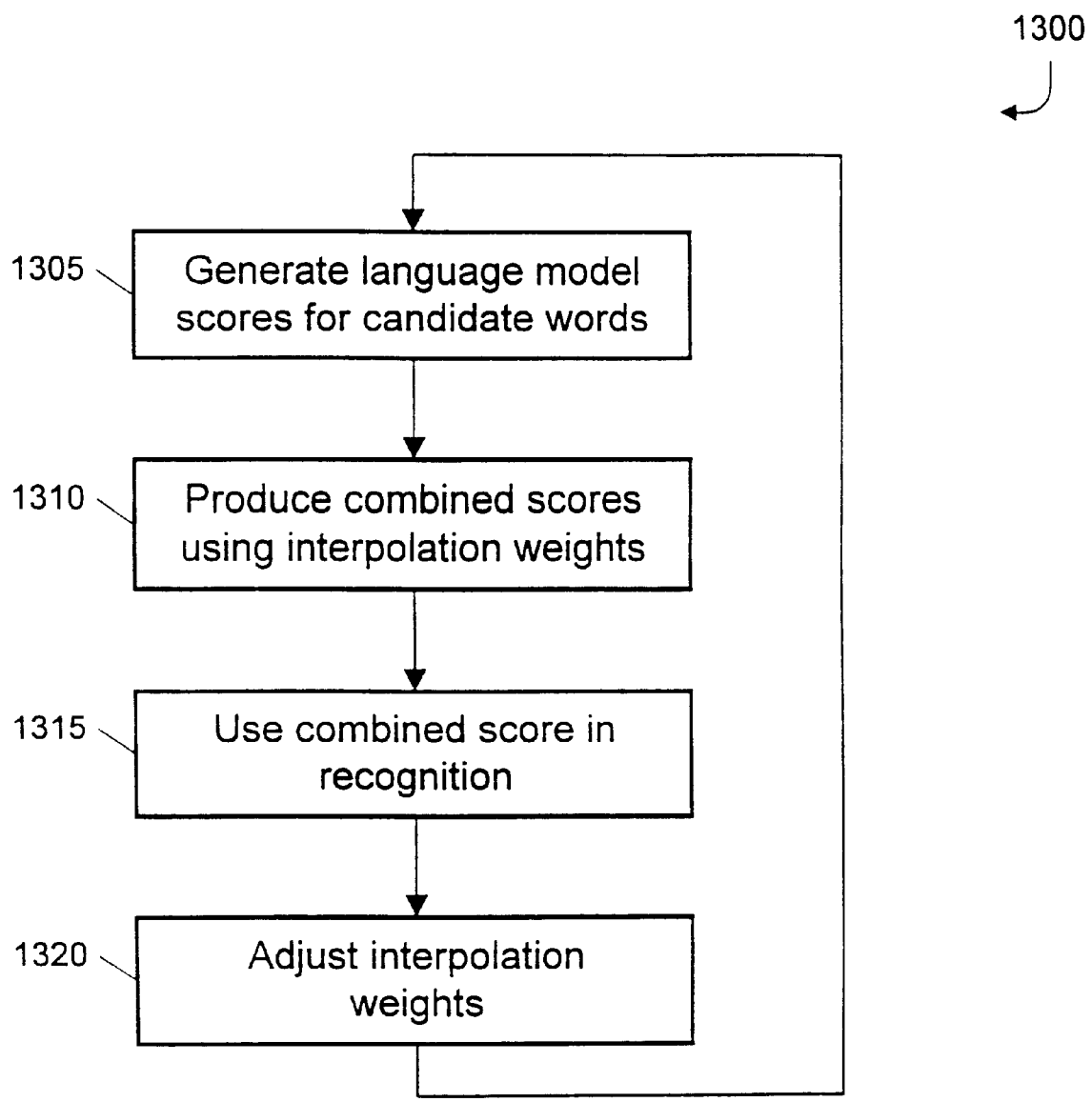

Referring to FIG. 13, the recognizer 215 may use the dynamic interpolation technique according to a procedure 1300. First, the recognizer 215 generates language model scores for a set of candidate words using a collection of language models (step 1305). For example, a first language model may produce scores $P_1(w_a)$ and $P_1(w_b)$ for words $w_a$ and $w_b$, while a second language model produces scores $P_2(w_a)$ and $P_2(w_b)$ for the same words. The recognizer 215 then combines the scores produced by the language models using interpolation weights to produce a combined language model score for each word (step 1310). For example, the recognizer may produce $P_C(w_a)$, a combined score for the word $w_a$, as:

$$P_C(w_a) = \lambda_1 P_1(w_a) + \lambda_2 P_2(w_a),$$

where $\lambda_1$ and $\lambda_2$ are, respectively, interpolation weights for the first and second language models, and:

$$\lambda_1 + \lambda_2 = 1.0.$$

This process may be referred to as interpolating the two language models using the interpolation weights $\lambda_1$, $\lambda_2$. The recognizer 215 uses the combined language model scores for the candidate words as one factor in identifying a candidate word $w_x$ that best corresponds to a user's utterance or a portion of the utterance (step 1315).

After the best candidate word $w_x$ is identified, the recognizer 215 automatically adjusts the interpolation weights $\lambda_1$, $\lambda_2$ to emphasize the language model that most accurately models a user's speech (step 1320). In particular, after a word $w_x$ is identified as the best candidate word, the recognizer uses the dynamic interpolation technique to generate new interpolation weights $\lambda_1'$, $\lambda_2'$ as:

$$\lambda_1' = \frac{R \cdot \lambda_1 + \frac{\lambda_1 P_1(w_x)}{\lambda_1 P_1(w_x) + \lambda_2 P_2(w_x)}}{R+1} \text{ and}$$

$$\lambda_2' = \frac{R \cdot \lambda_2 + \frac{\lambda_2 P_2(w)}{\lambda_1 P_1(w) + \lambda_2 P_2(w)}}{R+1},$$

where R is a relevance factor used to control the contribution that the previous interpolation weights make to the new interpolation weights. Instead of updating the interpolation weights after each word is recognized, the recognizer may use the dynamic interpolation technique to update the interpolation weights after a series of k words ($w_1, w_2 \ldots w_k$) have been identified as best recognition candidates. In that case, the new interpolation weights may be expressed as:

$$\lambda_1' = \frac{R \cdot \lambda_1 + \sum_{J=1}^{k} \left( \frac{\lambda_1 P_1(w_J)}{\lambda_1 P_1(w_J) + \lambda_2 P_2(w_J)} \right)}{R+k} \text{ and}$$

$$\lambda_2' = \frac{R \cdot \lambda_2 + \sum_{J=1}^{k} \left( \frac{\lambda_2 P_2(w_J)}{\lambda_1 P_1(w_J) + \lambda_2 P_2(w_J)} \right)}{R+k}.$$

The recognizer 215 uses the relevance factor R to control the contribution that previous interpolation weights make to new interpolation weights. In general, increasing the value of R increases the contribution made by previous interpolation weights. If R is too big, then the combined language model may not track the user's speech quickly enough. By contrast, if R is too small, the language model tracks the user's speech too closely so that a single word may have a large impact on the combined language model. In one implementation, a value for R of 200 has been found to produce suitable results. When R has a value of 200, Table 1 shows the approximate degree to which the initial interpolation weights affect the new interpolation weights for different numbers of words (i.e., different values of k).

TABLE 1

| Number of Words Recognized | Percent Initial | Percent New |
|---|---|---|
| 0 | 100 | 0 |
| 200 | 50 | 50 |
| 400 | 33.333 | 66.667 |
| 600 | 25 | 75 |
| 800 | 20 | 80 |

Thus, the impact of the initial interpolation weights on the language model score decreases as the number of recognized words increases.

The dynamic interpolation technique may be extended to a set of A language models using interpolation weights $\lambda_1 \ldots \lambda_A$, where:

$$\lambda_1 + \lambda_2 + \ldots + \lambda_A = 1.$$

In this case, the interpolation weights may be adjusted dynamically as:

$$\lambda'_x = \frac{R \cdot \lambda_x + \sum_{J=1}^{k} \left( \frac{\lambda_x P_x(w_J)}{\sum_{a=1}^{A} \lambda_a P_a(w_J)} \right)}{R + k}.$$

After adjusting the interpolation weights (step 1320), the recognizer generates language model scores for a new set of candidate words (step 1305) and repeats the process.

In one implementation, the recognizer 215 employs four language models. The first language model is a bigram model that indicates the frequency with which a word occurs in the context of a preceding word. For example, a bigram model may indicate that the word "word" is more likely to follow the word "the" than is the word "is". The word bigram model is generated from a large sample of text. In general, probabilities produced by the word bigram model do not change during use, but words may be added to the word bigram model or subtracted from the word bigram model as the words are added to or subtracted from the active vocabulary.

The second language model is a category model that indicates the frequency with which a word occurs in the context of a preceding category. A simple category model may include categories such as "nouns" or "adjectives". For example, such a simple category model may indicate that the word "is" is more likely to follow words from the "nouns" category than word from the "adjectives" category. More complex category models may include categories such as "places", "sports adjectives" or "medical nouns". As with the word bigram model, the category model is generated from a large sample of data and produces probabilities that do not change during use.

Figure 14:
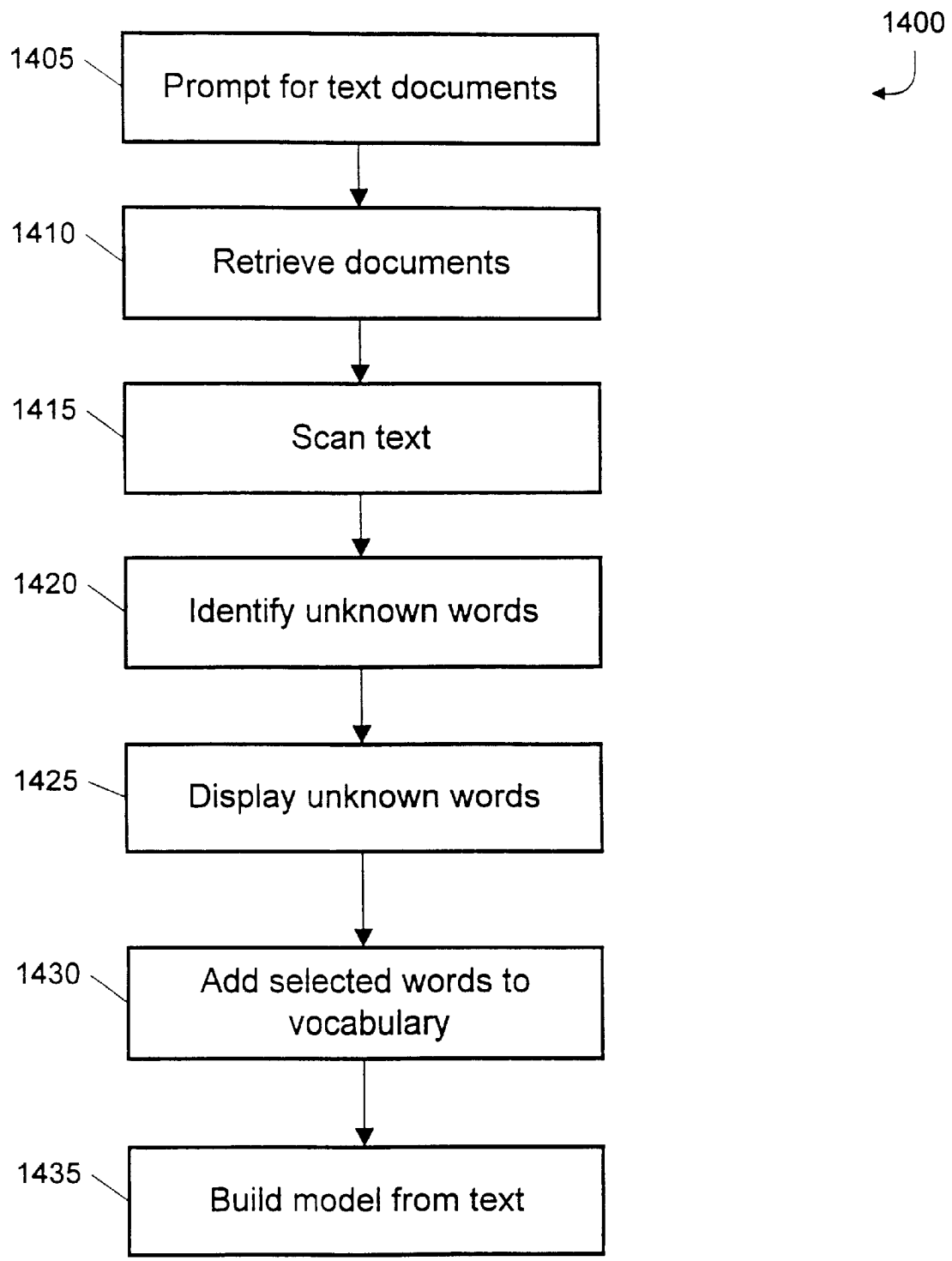
Figure 16:
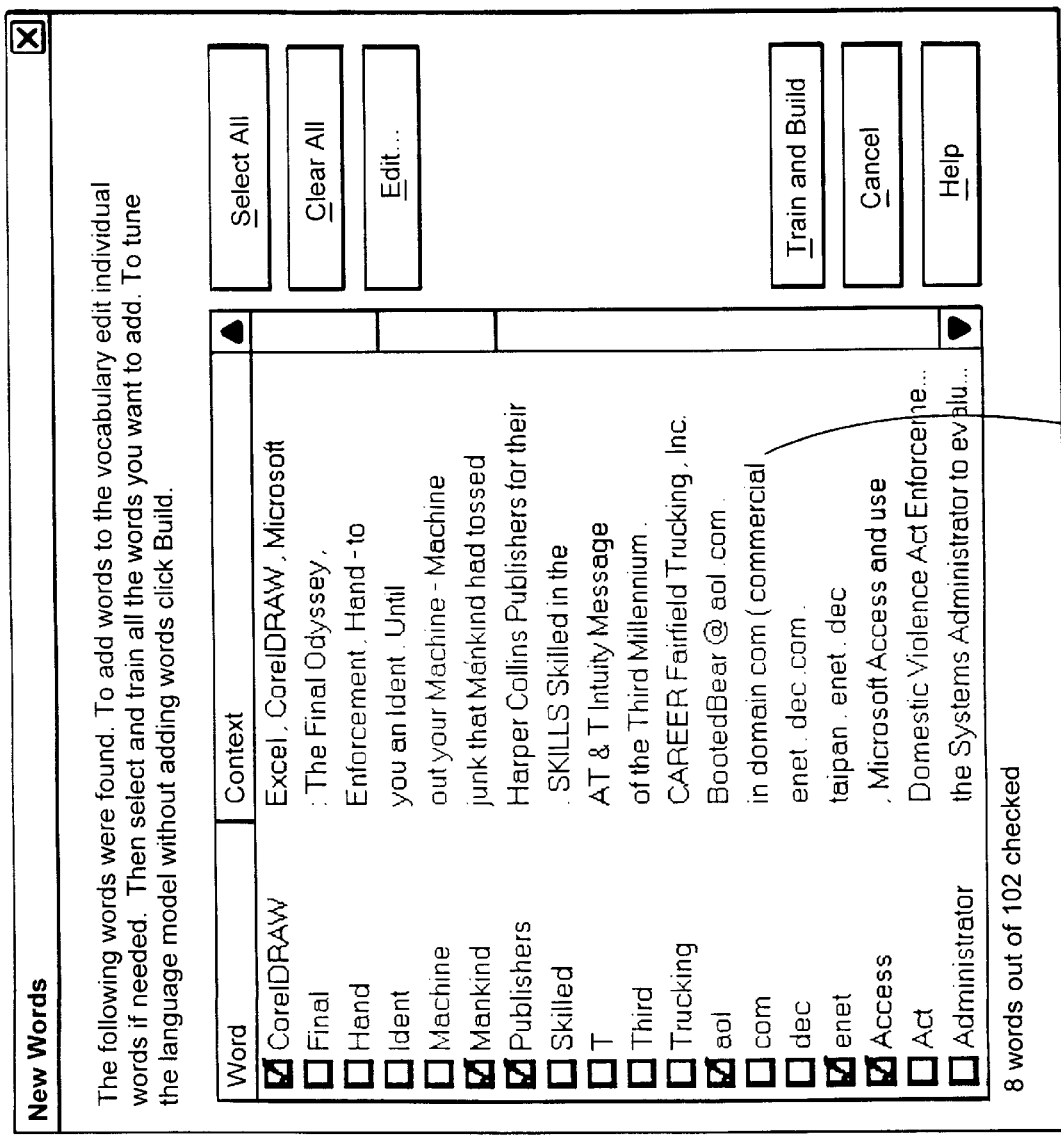

The third language model is a topic model generated from user-supplied text. The topic model is generated by the vocabulary builder of the control/interface module 220 according to the procedure 1400 illustrated in FIG. 14. Referring also to FIG. 15, the vocabulary builder first prompts a user to identify text associated with uses to which the user plans to put the recognition software (step 1405). In response to this prompt, the user may identify a collection of text documents that the vocabulary builder then retrieves (step 1410). The vocabulary builder then scans the text (step 1415) and identifies a list of words 1600 that are not in the active vocabulary 230 (step 1420). As shown in FIG. 16, the vocabulary builder then displays this list of words 1600 to the user (step 1425) and permits the user to select words from the list using check boxes 1505. Next, the vocabulary builder adds any selected words to the active vocabulary (step 1430). Finally, the vocabulary builder builds a bigram topic model using all pairs of words in which both words of the pair are included in the active vocabulary (step 1435).

The fourth language model is a recent buffer language model that keeps track of the last 1000 words spoken by the user and generates a bigram model based on those words.

The recognizer 215 uses a dynamic interpolation technique in which the first, second and third language models are given equal initial weights and the fourth language model is given a fixed weight. Thereafter, the dynamic interpolation technique is used to adjust the weights for the first, second and third language models, while keeping the weight of the fourth language model at the fixed value. For example, the fourth language model may be accorded a weight of 0.3 so that the combination of the first, second, and third language models shares a weight of 0.7. The fourth language model is given a fixed weight because the fourth model is subject to small sample fluctuations that may adversely affect the dynamic interpolation approach.

Other embodiments are within the scope of the following claims. For example, different numbers and types of language models may be combined. All language models may make variable contributions to the combined model, or some of the language models may make fixed contributions. Similarly, minimum and/or maximum values may be associated with the weights for different language models.

In addition, the techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of speech recognition using multiple language models, the method comprising:

receiving language model results for speech recognition candidates for an utterance from multiple language models;

combining the results from the multiple language models according to a combination expression to produce combined language model results, the combination expression applying different combination weights to the results received from the respective language models;

selecting one of the candidates selecting based on the combined language model results;

adjusting at least one of the combination expression weights based on the selected candidate; and repeating the combining, selecting, and adjusting for a subsequent utterance.

2. The method of claim 1, wherein:

the adjusting comprises adjusting the combination weights using language model results associated with the selected candidate.

3. The method of claim 2, wherein:

each language model result comprises a numerical score that indicates a likelihood associated with a candidate; and the combination expression multiplies the numerical score for a language model by a combination weight associated with the language model.

4. The method of claim 1, wherein a language model result is associated with a topic language model generated from user-supplied text.

5. The method of claim 4, further comprising generating the topic language model by:

prompting a user to identify a source of text;

retrieving text from the source of text identified by the user; and building the topic language model from the retrieved text.

6. The method of claim 5, wherein the source of text comprises a file including text.

7. The method of claim 1, further comprising selecting a candidate by evaluating the candidates using the combined language model results.

8. The method of claim 7, further comprising selecting a candidate by evaluating the candidates using the combined language model results and acoustic information associated with the candidates.

9. The method of claim 8, wherein the evaluating uses a vocabulary of words, and wherein building the topic language model further comprises:

prompting a user to identify a source of text;

retrieving text from the source of text identified by the user;

scanning the retrieved text to identify words from the text that are not included in the vocabulary of words;

displaying the identified words to the user;

prompting the user to select words to be included in the vocabulary; and adding words selected by the user to the vocabulary.

10. The method of claim 9, further comprising building the topic language model from the retrieved text.

11. The method of claim 10, wherein the building the topic language model comprises building the topic language model for words included in the vocabulary of words.

12. The method of claim 1, wherein one of the language models comprises a language model formed from words in one or more user specified files.

13. The method of claim 1, wherein one of the language models comprises a language model formed from words in a document being dictated.

14. The method of claim 1, wherein one of the language models comprises a language model formed from a list of recently recognized words.

15. The method of claim 14, wherein the list of recently recognized words comprises a list of one thousand most recently recognized words.

16. The method of claim 1, wherein the combination expression is of the form:

$$P_c(w_a) = \Sigma \lambda_x P_x(w_a)$$

where $P_c(W_a)$ represents the combined language model score for word a, $P_x(w_a)$ represents the score for word a for language model x, and $\lambda_x$ represents the combination expression weight for language model x.

17. The method of claim 16, wherein $\Sigma \lambda_x = 1$.

18. The method of claim 1, wherein the adjusting comprises adjusting based on previous weights.

19. The method of claim 1, wherein the adjusting comprises adjusting using an adjustment factor that controls how rapidly the weights change.

20. A method of generating language model results for use in speech recognition, the method comprising:

prompting a user to identify a source of text;

retrieving text from the source of text identified by the user;

building a topic language model from the retrieved text;

producing combined language model results by combining language model results from the topic language model with language model results from one or more other language models according to a combination expression, the combination expression applying different combination weights to the results received from the respective language models; and adjusting at least one of the combination weights based on performance of the language models.

21. The method of claim 20, further comprising:

scanning the retrieved text to identify words from the text that are not included in a vocabulary of words;

displaying the identified words to the user;

prompting the user to select words to be included in the vocabulary; and adding words selected by the user to the vocabulary.

22. The method of claim 21, wherein the building the topic language model comprises building the topic language model for words included in the vocabulary of words.

23. The method of claim 20, wherein the source of text comprises a file including text.

24. A computer program, residing on a computer readable medium, for a speech recognition system comprising a processor and an input device, the computer program comprising instructions performing speech recognition by causing the processor to perform the following operations:

receive language model results for speech recognition candidates for an utterance from multiple language models;

combine the results from the multiple language models according to a combination expression to produce combined language model results, the combination expression applying different combination weights to the results received from the respective language models;

evaluate the candidates using the combined language model results to select one of the candidates;

adjust at least one of the combination expression weights based on the selected candidate; and repeat the combining, selecting, and adjusting for a subsequent utterance.

25. The computer program of claim 24, further comprising instructions for causing a processor to:

prompt a user to identify a source of text;

retrieve text from the source of text identified by the user; and build a topic language model from the retrieved text.

26. A computer program, residing on a computer readable medium, for a speech recognition system comprising a processor and an input device, the computer program comprising instructions for generating a topic language model for use in speech recognition by causing the processor to perform the following operations:

prompt a user to identify a source of text;

retrieve text from the source of text identified by the user;

build a topic language model from the retrieved text;

produce combined language model results by combining language model results from the topic language model with language model results from one or more other language models according to a combination expression, the combination expression applying different combination weights to the results received from the respective language models; and adjust at least one of the combination weights based on performance of the language models.

27. The method of claim 26, wherein the source of text comprises a file including text.

28. A method of speech recognition using multiple language models, the method comprising:

receiving language model results for speech recognition candidates for an utterance from multiple language models, the language models including at least one language model formed from recently recognized words;

combining the results from the multiple language models according to a combination expression to produce combined language model results, the combination expression being of the form:

$$P_c(w_a) = \Sigma \lambda_x P_x(w_a)$$

where $P_c(w_a)$ represents the combined language model score for word a, $P_x(w_a)$ represents the score for word a for language model x, and $\lambda_x$ represents a combination expression weight for language model x;

selecting one of the candidates based on the combined language model results;

adjusting at least one of the combination expression weights, $\lambda_x$, based on the selected candidate; and repeating the combining, selecting, and adjusting for a subsequent utterance.

* * * * *